United States Patent
Kano et al.

(10) Patent No.: US 7,042,882 B2
(45) Date of Patent: May 9, 2006

(54) LAYER-STRUCTURED PATH SETUP METHOD AND NODE APPARATUS FOR IMPLEMENTING SAME

(75) Inventors: Shinya Kano, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 937 days.

(21) Appl. No.: 10/036,292

(22) Filed: Nov. 7, 2001

(65) Prior Publication Data

US 2002/0141444 A1 Oct. 3, 2002

(30) Foreign Application Priority Data

Mar. 29, 2001 (JP) ............................. 2001-095992

(51) Int. Cl.
*H04L 12/56* (2006.01)

(52) U.S. Cl. .................................... 370/395.3; 370/410

(58) Field of Classification Search ................ 370/351, 370/389, 392, 395.1, 395.2, 395.21, 395.31, 370/395.3, 400, 410
See application file for complete search history.

(56) References Cited

U.S. PATENT DOCUMENTS 6,560,654 B1 * 5/2003 Fedyk et al. ................ 709/239
6,665,273 B1 * 12/2003 Goguen et al. .............. 370/252
6,879,594 B1 * 4/2005 Lee et al. .................... 370/408
2002/0103924 A1 * 8/2002 Nomura ...................... 709/235
2004/0202171 A1 * 10/2004 Hama ....................... 370/395.1

FOREIGN PATENT DOCUMENTS

JP 2000049865 2/2000

* cited by examiner

*Primary Examiner*—Kwang Bin Yao
(74) *Attorney, Agent, or Firm*—Katten Muchin Rosenman LLP

(57) ABSTRACT

A layer-structured MPLS path is set up in a short time by using a minimum number of control messages. A relay apparatus acting as the start point of the highest-layer L2 path creates a label request message specifying the intermediate-point and end-point relay apparatuses for all the paths of all the layers, and transmits it to the end-point relay apparatus of the L2 path. At a relay apparatus permitted to use an already established L1 path, instead of requesting a label of the L1 path, the label of the already established path is inserted in the label request message. In response to the label request message, a label mapping message is transmitted and transferred to the start-point relay apparatus. With this message, each node determines the labels associated with it and transfers them to its adjacent relay apparatus.

32 Claims, 25 Drawing Sheets

LAYER-STRUCTURED PATH SETUP METHOD AND NODE APPARATUS FOR IMPLEMENTING SAME

BACKGROUND OF THE INVENTION

1. Field of the Invention

The present invention relates to a method of setting up a layer-structured path constructed from multiple layers of paths, and a node apparatus for implementing the same.

2. Description of the Related Art

To transfer packets such as IP (Internet Protocol) packets at high speed, there has been developed a technology known as MPLS (Multiprotocol Label Switching) in which label information is attached to each packet in addition to the header information contained therein and the packet is transferred based on the thus attached label.

A relay apparatus (router) maintains a label table which indicates an outgoing label and an outgoing interface corresponding to the incoming interface and the incoming label. The relay apparatus that receives a packet with a label attached to it converts the incoming label into an outgoing label by using the label table, and outputs the packet on the outgoing interface. This simplifies packet header processing and achieves high-speed packet transfer. The MPLS technology offers the further advantage that, by using a layer-structured label and grouping a plurality of transfer units together, efficient packet routing can be achieved.

A packet transfer procedure using the layer-structured label scheme will be described below. FIG. 1 is a diagram showing how a packet is transferred from relay apparatus 1 to relay apparatus 5. As shown, a path 12 connecting between the relay apparatuses 1 and 3 using L1 labels a and b and a path 14 connecting between the relay apparatuses 3 and 5 using L1 labels a and b are established as lower-layer paths (L1 paths) in MPLS. In addition, an L2 path 16 using L2 labels A and C is established as a higher-layer path (L2 path) passing above the two L1 paths 12 and 13.

The packet transmitting relay apparatus 1 transmits a packet 18 by attaching the label A for the L2 path and the label a for the L1 path to the packet header. The relay apparatus 2 that received the packet 18 through the incoming interface 1 converts the L1 label a attached to the packet 18 into the L1 label b by referring to the label table 20, and transmits the thus labeled packet 22 onto the outgoing interface 2. The relay apparatus 3 that received the packet 22 through the incoming interface 1 converts the L1 label b and L2 label A attached to the packet 22 into the L1 label a and L2 label C by referring to the label table 24, and transmits the thus labeled packet 26 onto the outgoing interface 2. The relay apparatus 4 that received the packet 26 through the incoming interface 1 converts the L1 label a attached to the packet 26 into the L1 label b by referring to the label table 28, and transmits the thus labeled packet 30 onto the outgoing interface 2. The relay apparatus 5 receives the packet 30, with the L1 label a attached to it, through the incoming interface 1.

The label distribution protocol shown in FIG. 2 is used to construct the label tables used for packet forwarding.

In FIG. 2, the source node 1 requesting a path setup transmits a label request message 32, specifying the route (relay nodes) to the path terminating node 4, hop by hop, to the path terminating node. Then, the terminating node 4 returns a label mapping message 34 for label mapping, to the source node 1. Using this label mapping message, the label mapped according to the label request is notified to each subsequent node.

This label distribution protocol has the function of only distributing a single-layer label. To construct an L2 path, therefore, the procedure requires that L1 paths necessary for the construction of the L2 path be established in advance by using the label distribution protocol. Then, using the label distribution protocol again, the L2 path is constructed above the thus established L1 paths.

In an optical network constructed using OXCs (Optical Cross Connects) and WDM (Wavelength Division Multiplexing), one optical wavelength is treated as one label, and optical wavelength paths are established by using a protocol created by extending the above-described label distribution protocol. Then, using the label distribution protocol again, an MPLS path is established above the thus established optical wavelength paths.

To construct a new MPLS path above the optical wavelength paths, the optical wavelength paths necessary for the construction of the new MPLS path are established in advance by using the label distribution protocol, as in the case of the L2 path described above. Then, the MPLS path is established above the thus established optical wavelength paths by using the label distribution protocol.

As described above, an L2 path is usually established above already established L1 paths. As a result, when establishing an L2 path along a route over a portion of which L1 paths are not established, L1 paths are established first by using the label distribution protocol, and then the L2 path is established by using the label distribution protocol once again.

Therefore, when establishing an L2 path along a route over a portion of which L1 paths are not established, the label distribution protocol has to be used twice, leading to the problem that it takes time to establish the L2 path because many control messages flow through the network and because the protocol has to be activated in sequence.

In an optical network also, when constructing an MPLS path above optical wavelength paths, a similar problem occurs if there is a portion over which optical wavelength paths are not established.

SUMMARY OF THE INVENTION

Accordingly, it is an object of the present invention to provide a path setup method that can establish a layer-structured path in a short time by using a minimum number of control messages, and a node apparatus for implementing the same.

According to the present invention, there is provided a method of setting up a layer-structured path constructed from multiple layers of paths, comprising the steps of:

(a) transmitting a first message from a start-point node to an end-point node of the highest-layer path, the first message carrying a label request for a plurality of layer paths;

(b) mapping labels to the requested paths at each node in response to the label request;

(c) transmitting a second message from the end-point node to the start-point node of the highest-layer path in response to the first message, thereby reporting by means of the second message the labels mapped in step (b); and (d) storing the reported labels at each node.

According to the present invention, there is also provided a node apparatus for setting up a layer-structured path constructed from multiple layers of paths, comprising: means for generating a first message which contains a label request for a plurality of layer paths, and which is transmitted to an end-point node of the highest-layer path; means for transmitting the generated first message; means for receiving a second message as a response to the first message; and means for storing a label that is contained in the received second message as an response to the label request.

According to the present invention, there is also provided a node apparatus for setting up a layer-structured path constructed from multiple layers of paths, comprising: means for receiving and then transmitting a first message that contains a label request for a plurality of layer paths, and that is being transferred from a start-point node to an end-point node of the highest-layer path; means for mapping labels to the requested paths in response to the label request; means for receiving a second message as a response to the first message, and for transmitting the second message by including therein the labels mapped by the mapping means; and means for storing the labels contained in the received second message.

According to the present invention, there is also provided a node apparatus for setting up a layer-structured path constructed from multiple layers of paths, comprising: means for receiving a first message that is transmitted from a start-point node of the highest-layer path, and that contains a label request for a plurality of layer paths; means for mapping labels to the requested paths in response to the label request; and means for transmitting, in response to the first message, a second message containing therein the labels mapped by the mapping means.

DESCRIPTION OF THE PREFERRED EMBODIMENTS

A path setup procedure according to a first embodiment of the layer-structured path setup method of the present invention will be described below with reference to FIGS. 3 to 5.

Figure 1:
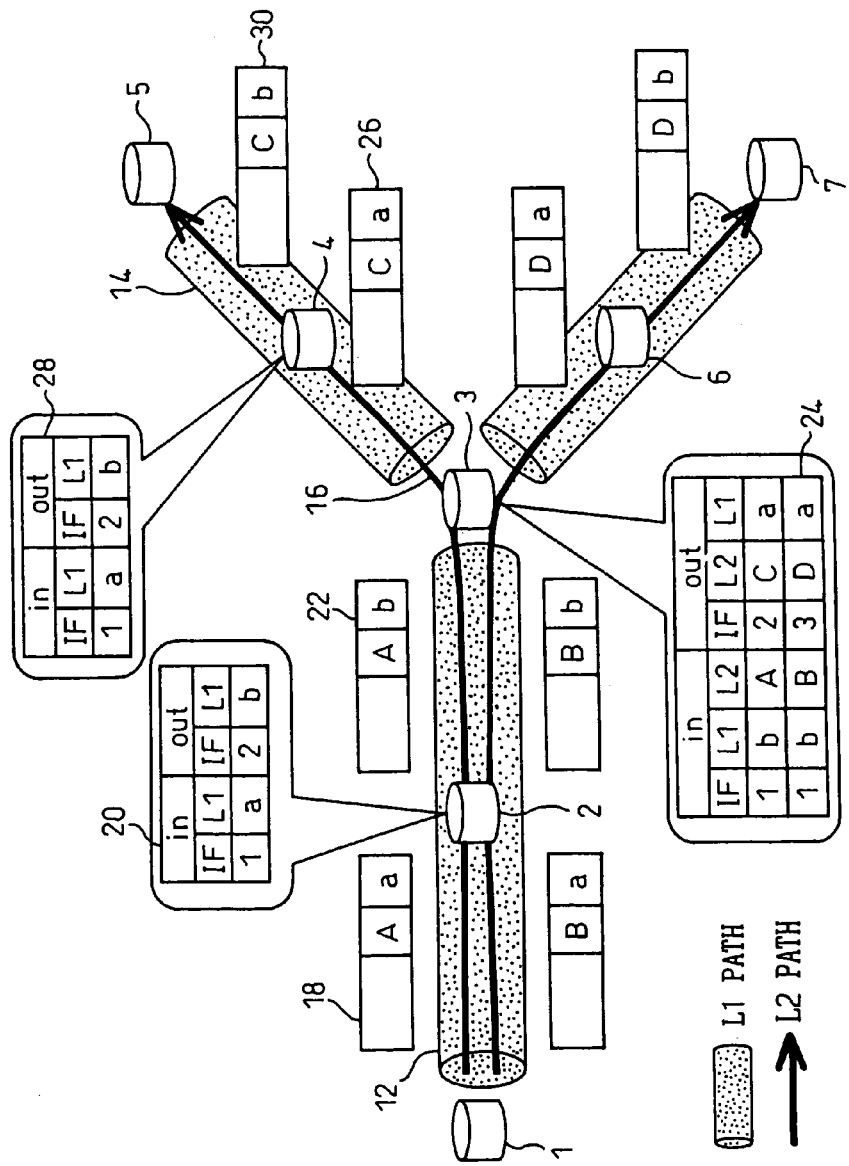
FIG. 1 is a diagram for explaining an MPLS method using a layer-structured label.
Figure 2:
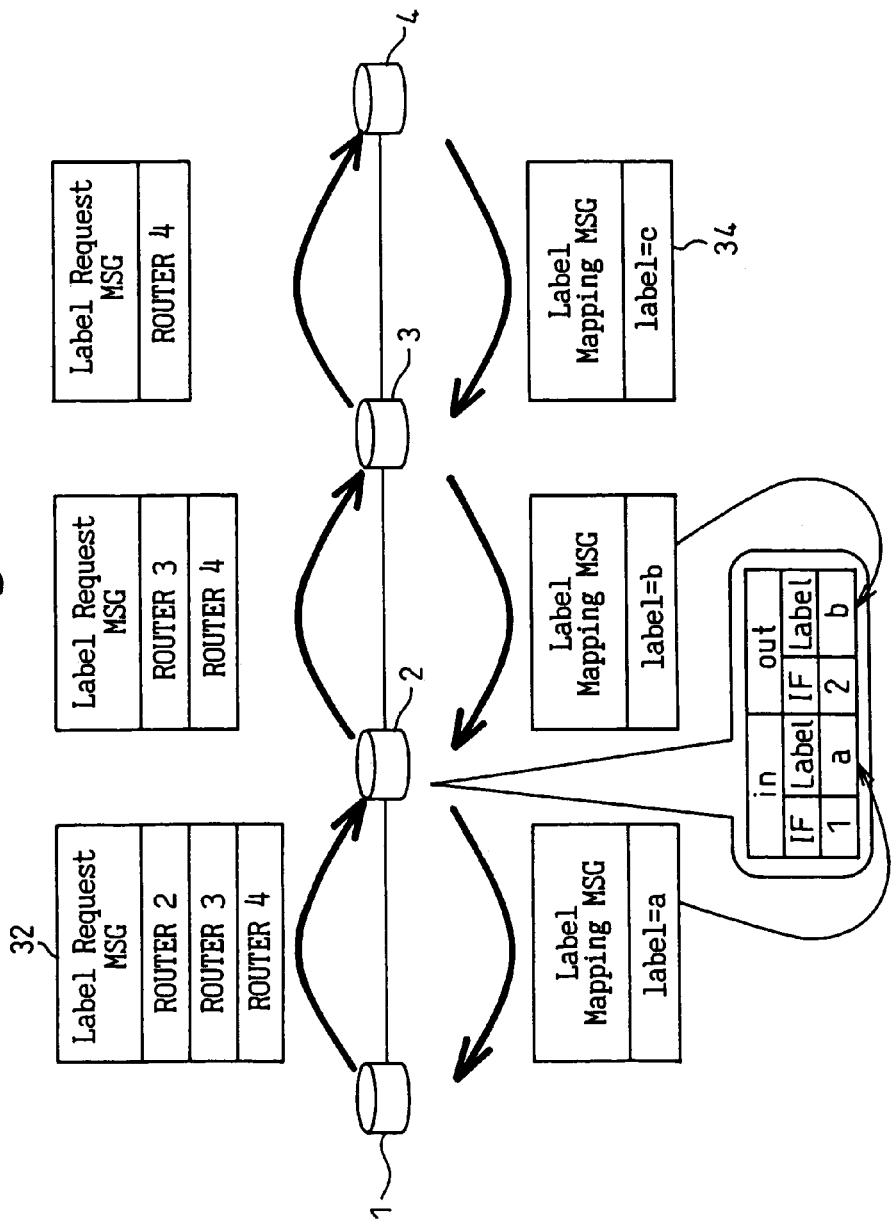
FIG. 2 is a diagram for explaining a label distribution protocol according to the prior art.
Figure 3:
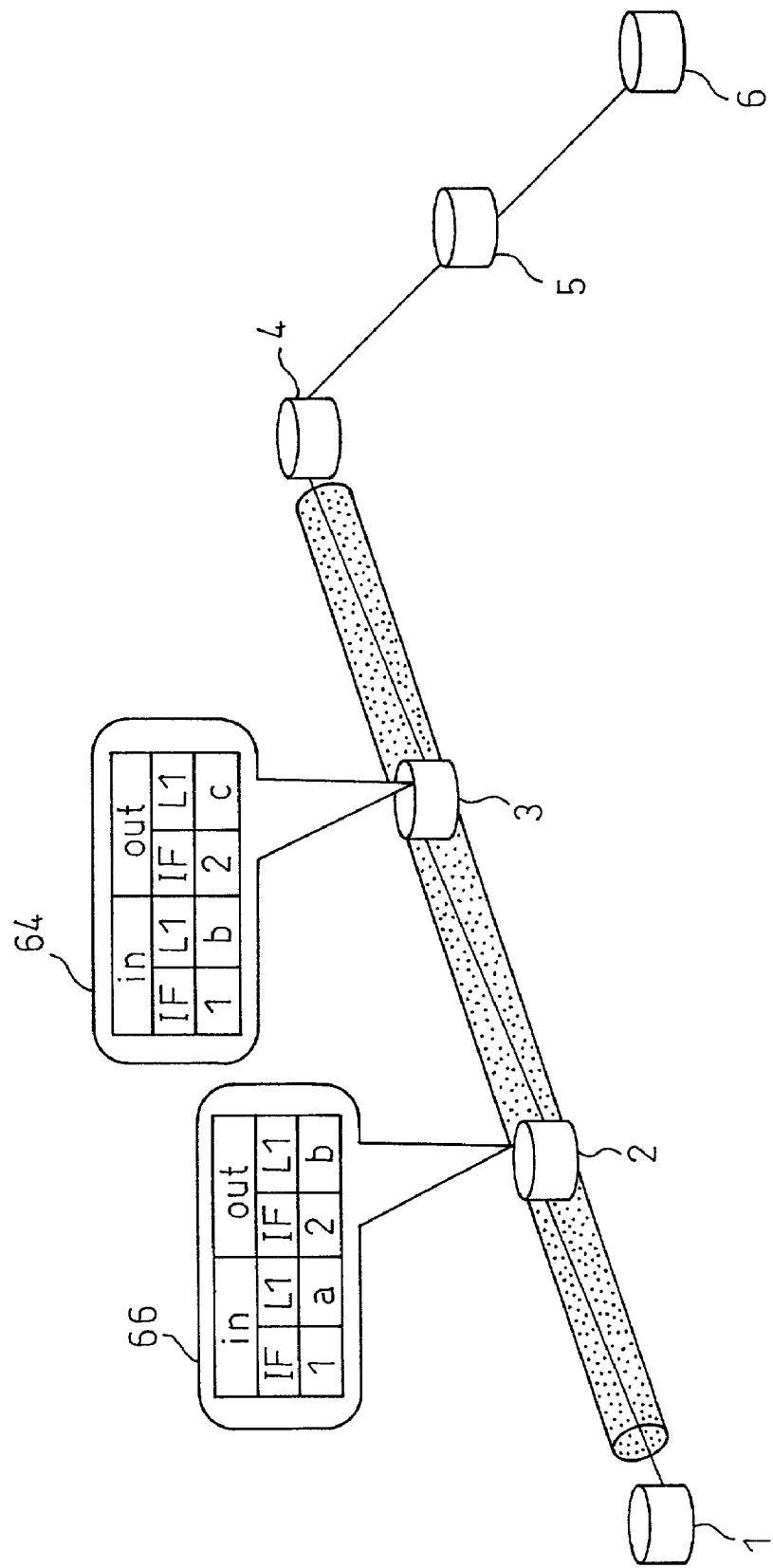
FIG. 3 is a diagram showing a condition before a path is set up in one example of a path setup procedure according to a first embodiment of the present invention.

As shown in FIG. 3, an L1 path is pre-established only between the relay apparatuses 1 and 4 by using L1 labels a, b, and c (label tables 66 and 64 are stored at relay apparatuses 2 and 3, respectively). Assuming this condition, a description will be given of how an L2 path can be established between the relay apparatuses 1 and 6 above the L1 path already established between the relay apparatuses 1 and 4 and an L1 path newly established passing through the relay apparatuses 4, 5, and 6.

To set up the above path, the relay apparatus 1 first determines the relay apparatuses through which the requested path is to be routed. It also determines the start-point, intermediate-point, and end-point relay apparatuses for the paths of the respective layers. In the illustrated example, the respective relay apparatuses are determined as follows:

Relay apparatus 1 as L1 start point and L2 start point,
relay apparatus 2 as L1 intermediate point,
relay apparatus 3 as L1 intermediate point,
relay apparatus 4 as L1 end point, L2 intermediate point, and L1 start point,
relay apparatus 5 as L1 intermediate point, and
relay apparatus 6 as L1 end point and L2 end point.

Next, the relay apparatus 1 checks whether or not the paths of the respective layers, with the relay apparatus 1 as the start point, are established. In the example of FIG. 3, only the L1 path is established.

Figure 4:
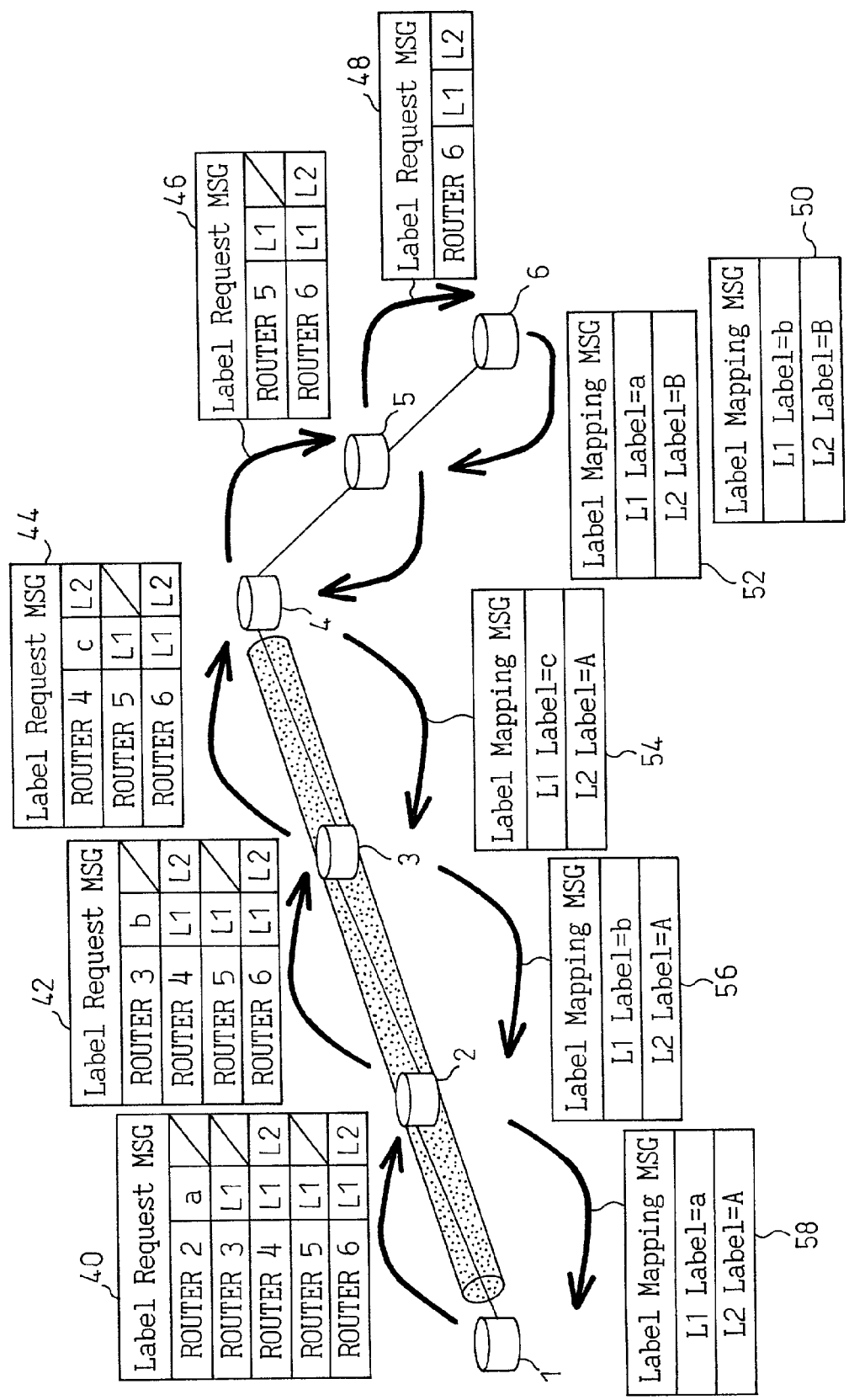
FIG. 4 is a diagram for explaining how label request and label mapping messages are transferred in one example of the path setup procedure according to the first embodiment of the present invention.
Figure 5:
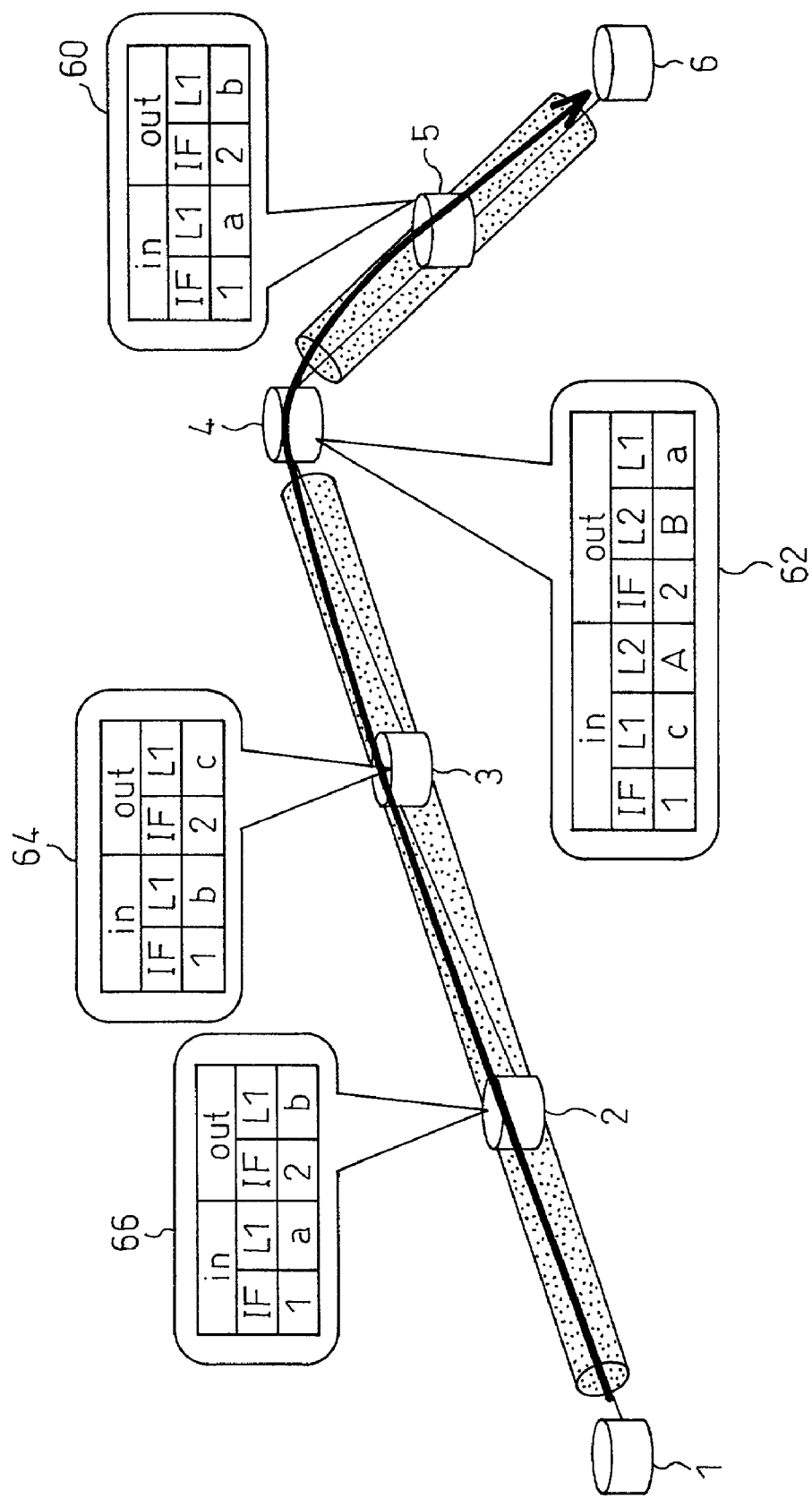
FIG. 5 is a diagram showing a condition after the path has been set up in one example of the path setup procedure according to the first embodiment of the present invention.

As shown in FIG. 4, the relay apparatus 1 creates a label request by extracting the above-listed relay apparatus information excluding the information related to the relay apparatus 1, and stores the label request in a label request message 40. Next, to notify that there is an already established L1 path, the L1 label a, which is used between the relay apparatus 1 and its downstream adjacent relay apparatus 2 on the already established L1 path, is stored in the label request message 40. Then, the label request message 40 is transmitted to the downstream relay apparatus 2 along the path.

The relay apparatus 2 receives the label request message 40, and stores the label layer associated with the relay apparatus 2 and the identity of the relay apparatus that transmitted the message. In the illustrated example, the associated label layer of L1 and the identity of the relay apparatus 1 are stored.

Next, it is determined whether any path to be set up with the relay apparatus 2 as the start point is specified in the label request message 40, and if such a path is specified, then it is determined whether the path is already established. The relay apparatus 2 further checks whether it is notified to use a path already established with the relay apparatus 2 as an intermediate point. In the illustrated example, no path is specified that is to be set up with the relay apparatus 2 as the start point, but the relay apparatus 2 is notified to use the already established L1 path.

The relay apparatus 2 extracts information other than that related to the relay apparatus 2 from the label request information contained in the label request message 40, and stores the extracted information in a label request message 42. Next, to specify the use of the already established L1 path, the L1 label b, which is used between the relay apparatus 2 and its downstream adjacent relay apparatus 3 on the already established L1 path, is stored in the label request message 42. Then, the label request message 42 is transmitted to the downstream relay apparatus 3 along the path.

The relay apparatus 3 receives the label request message 42, and stores the label layer associated with the relay apparatus 3 and the identity of the relay apparatus that transmitted the message. In the illustrated example, the associated label layer of L1 and the identity of the relay apparatus 2 are stored.

Next, it is determined whether any path to be set up with the relay apparatus 3 as the start point is specified in the label request message 42, and if such a path is specified, then it is determined whether the path is already established. The relay apparatus 3 further checks whether it is notified to use a path already established with the relay apparatus 3 as an intermediate point. In the illustrated example, no path is specified that is to be set up with the relay apparatus 3 as the start point, but the relay apparatus 3 is notified to use the already established L1 path.

The relay apparatus 3 extracts information other than that related to the relay apparatus 3 from the label request information contained in the label request message 42, and stores the extracted information in a label request message 44. Next, to specify the use of the already established L1 path, the L1 label c, which is used between the relay apparatus 3 and its downstream adjacent relay apparatus 4 on the already established L1 path, is stored in the label request message 44. Then, the label request message 44 is transmitted to the downstream relay apparatus 4 along the path.

The relay apparatus 4 receives the label request message 44, and stores the label layers associated with the relay apparatus 4 and the identity of the relay apparatus that transmitted the message. In the illustrated example, the associated label layers of L1 and L2 and the identity of the relay apparatus 3 are stored.

Next, it is determined whether any path to be set up with the relay apparatus 4 as the start point is specified in the label request message 44, and if such a path is specified, then it is determined whether the path is already established. The relay apparatus 4 further checks whether it is notified to use a path already established with the relay apparatus 4 as an intermediate point. In the illustrated example, a path to be set up with the relay apparatus 4 as the start point, that is, an L1 path, is specified, but the path is not yet established. Further, the relay apparatus 4 is notified to use the already established L1 path, but this path is terminated at the relay apparatus 4 which, therefore, is not an intermediate point of this path.

The relay apparatus 4 extracts information other than that related to the relay apparatus 4 from the label request information contained in the label request message 44, and stores the extracted information in a label request message 46. Then, the label request message 46 is transmitted to the downstream adjacent relay apparatus 5 along the path.

The relay apparatus 5 receives the label request message 46, and stores the label layer associated with the relay apparatus 5 and the identity of the relay apparatus that transmitted the message. In the illustrated example, the associated label layer of L1 and the identity of the relay apparatus 4 are stored.

Next, it is determined whether any path to be set up with the relay apparatus 5 as the start point is specified in the label request message 46, and if such a path is specified, then it is determined whether the path is already established. The relay apparatus 5 further checks whether it is notified to use a path already established with the relay apparatus 5 as an intermediate point. In the illustrated example, an L1 path to be set up with the relay apparatus 5 as the start point is not specified, nor is it notified to use an already established L1 path.

The relay apparatus 5 extracts information other than that related to the relay apparatus 5 from the label request information contained in the label request message 46, and stores the extracted information in a label request message 48. Then, the label request message 48 is transmitted to the downstream relay apparatus 6 along the path.

The relay apparatus 6 receives the label request message 48, and stores the label layers associated with the relay apparatus 6 and the identity of the relay apparatus that transmitted the message. In the illustrated example, the associated label layers of L1 and L2 and the identity of the relay apparatus 5 are stored.

Next, the relay apparatus 6 checks the label information contained in the label request message 48 to see whether, of the paths of the layers specified in the label request message 48, the paths of the layers specified to be set up with the relay apparatus 6 as the end point are already established. In this example, the relay apparatus 6 is not notified to use already established L1 and L2 paths.

The relay apparatus 6 assigns a new path label to each layer not established yet. If it is notified by a label to use an already established path, then that label is used. In the illustrated example, L1 label b and L2 label B are newly assigned to the L1 and L2 paths, respectively.

The relay apparatus 6 stores these labels in a label mapping message 50, and transmits the message to the relay apparatus 5 whose identity has previously been stored.

The relay apparatuses 5, 4, 3, and 2 receive the label mapping messages 50, 52, 54, and 56, respectively, and transmit the label mapping messages 52, 54, 56, and 58 to their adjacent relay apparatuses 4, 3, 2, and 1 whose identities have previously been stored at the respective relay apparatuses.

At each relay apparatus, of the labels contained in the received label mapping message, the labels of the layers associated with the receiving relay apparatus are extracted and stored. Further, each relay apparatus maps labels to the respective paths in accordance with the label request contained in the previously received label request message, and stores the thus mapped labels, while also entering them in the label mapping message for transmission. If a label, not a label request, has been received previously, specifying the use of an already established path, then that label is returned by entering it in the label mapping message.

In the example shown in FIG. 4, at the relay apparatus 5, the L1 label b is extracted from the label mapping message 50, and in place of it, the L1 label a, newly mapped in accordance with the label request, is stored in the label mapping message 52 to be transmitted. The label table 60 shown in FIG. 5 is stored at the relay apparatus 5.

At the relay apparatus 4, the L1 label a and L2 label B are extracted from the label mapping message 52, and in place of them, the L1 label c, contained in the label request message 44, and the L2 label A, newly mapped in accordance with the label request, are stored in the label mapping message 54 to be transmitted. The label table 62 shown in FIG. 5 is stored at the relay apparatus 4.

At the relay apparatus 3, the L1 label c is extracted from the label mapping message 54, and in place of it, the L1 label b contained in the label request message 42 is stored in the label mapping message 56 to be transmitted.

At the relay apparatus 2, the L1 label b is extracted from the label mapping message 56, and in place of it, the L1 label a contained in the label request message 40 is stored in the label mapping message 58 to be transmitted.

With the above procedure, by sequentially passing the messages from the relay apparatus 1 to the relay apparatus 6 and then back to the relay apparatus 1, not only is the new L1 path established between the relay apparatuses 4 and 6 via the relay apparatus 5, but at the same time, the L2 path is established between the relay apparatuses 1, 4, and 6 above the newly established L1 path and the L1 path already established between the relay apparatuses 1, 2, 3, and 4.

In the first embodiment of the invention, when using an already established path, the label mapped to that path is stored in the label request message to specify the path to be used; alternatively, the identifier identifying the path to be used, or the identifier of the upstream relay apparatus on the path to be used, may be stored instead of the label.

Figure 6:
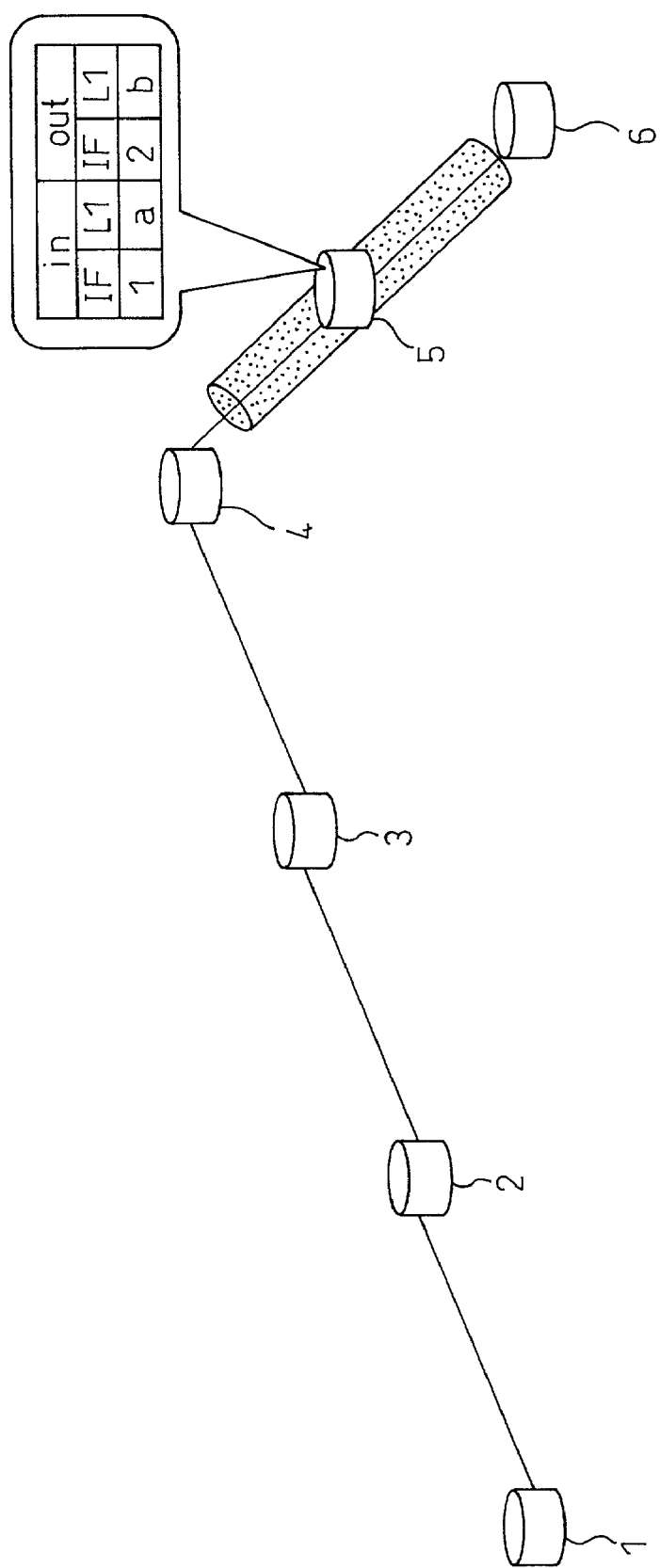
FIG. 6 is a diagram showing a condition before a path is set up in one example of a path setup procedure according to a second embodiment of the present invention.
Figure 7:
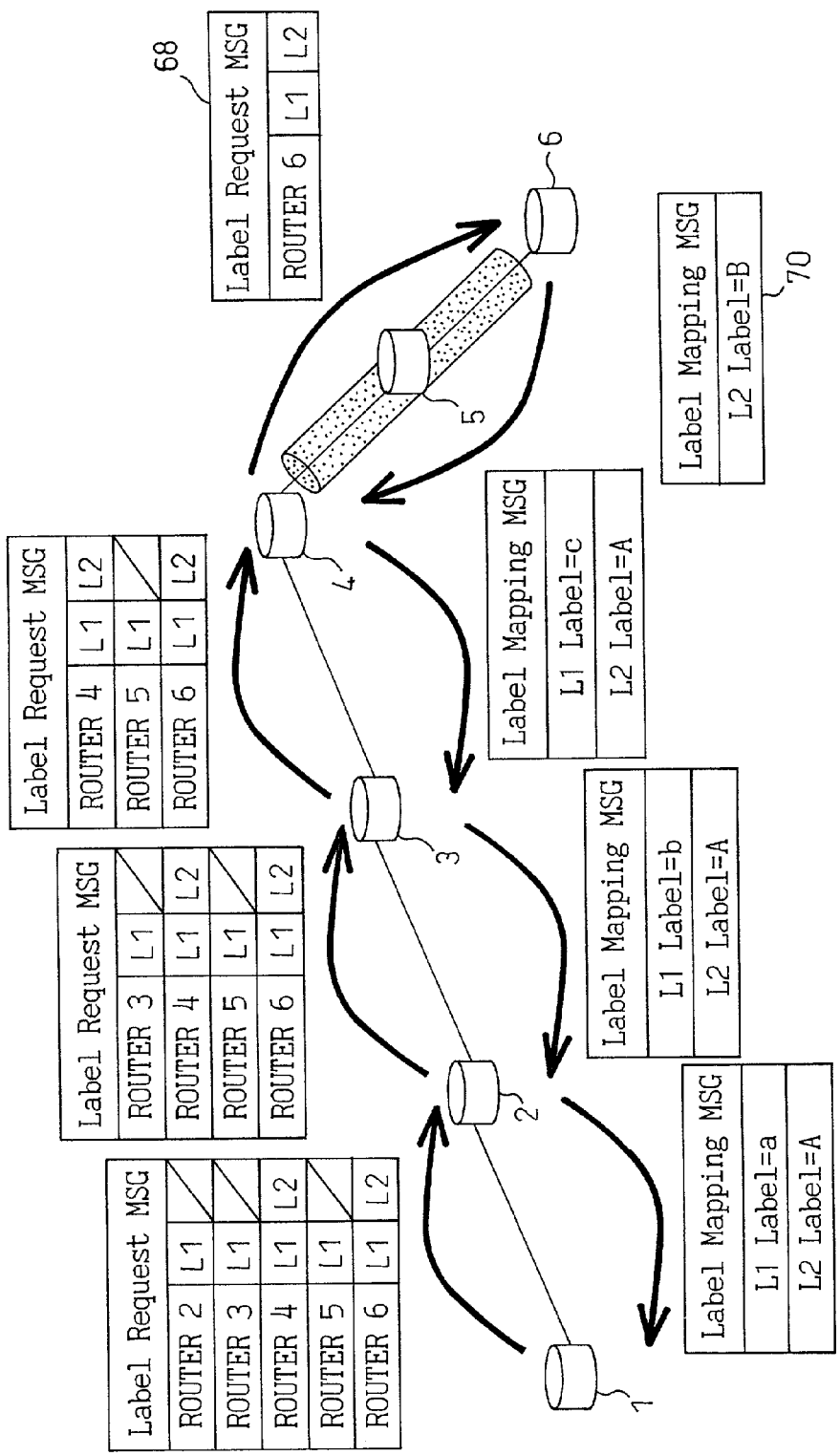
FIG. 7 is a diagram for explaining how label request and label mapping messages are transferred in one example of the path setup procedure according to the second embodiment of the present invention.
Figure 8:
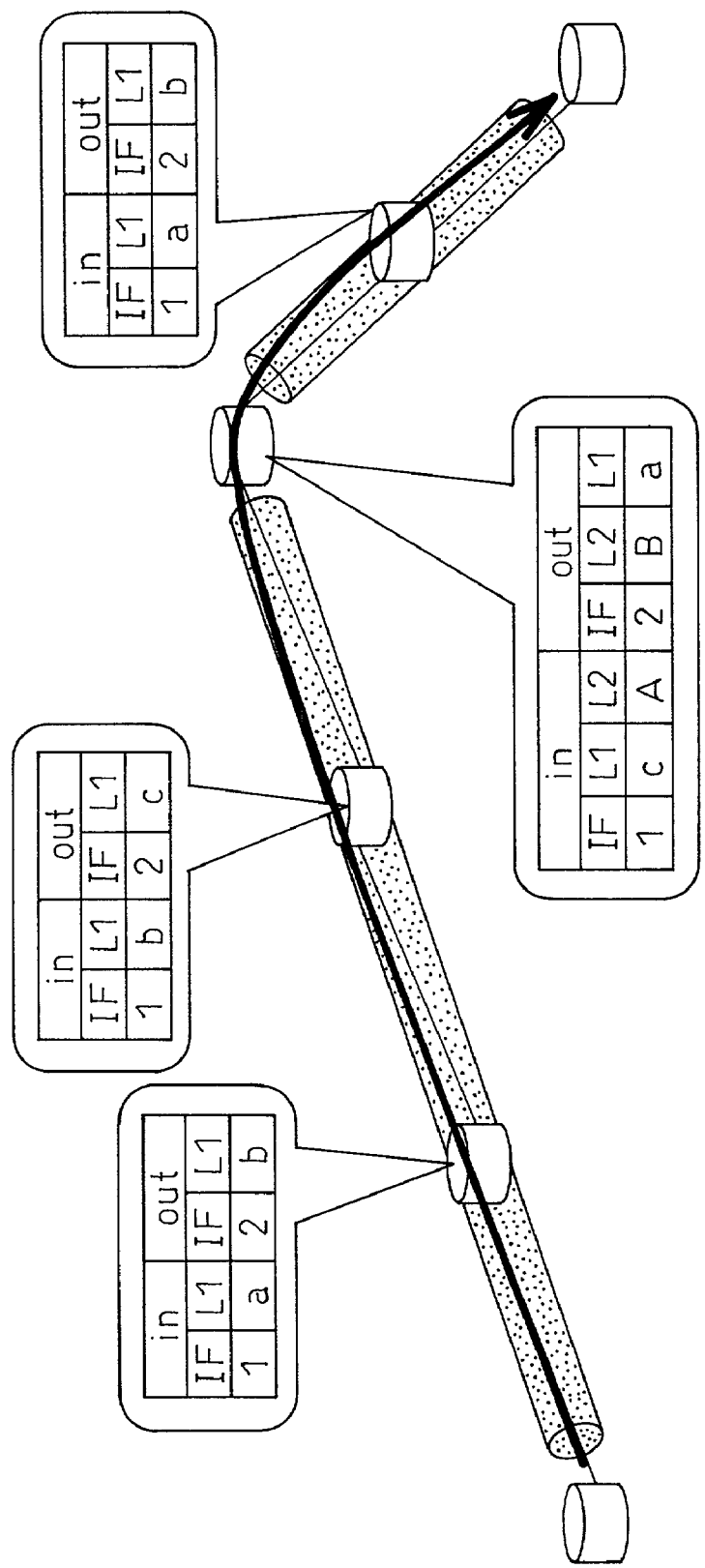
FIG. 8 is a diagram showing a condition after the path has been set up in one example of the path setup procedure according to the second embodiment of the present invention.

FIGS. 6 to 8 are diagrams for explaining a path setup procedure according to a second embodiment of the layer-structured path setup method of the present invention: FIGS. 6, 7, and 8 respectively correspond to FIGS. 3, 4, and 5 in the foregoing first embodiment.

In the first embodiment, when using an already established path, the label of the already established path was sent as a label request, but the second embodiment differs in that, in the section of the already established path, the label request message is sent by setting the end point of the already established path as the destination and the label mapping message is sent by setting the start point of that path as the destination.

More specifically, in FIG. 7, the label request message 68 to be transmitted from the relay apparatus 4 toward the relay apparatus 6 is sent out as data addressed to the relay apparatus 6, the end point of the L1 path established between the relay apparatuses 4, 5, and 6, that is, it is sent out, for example, as packet data with L1 label a attached to it, though not shown here. Likewise, the label mapping message 70 to be returned from the relay apparatus 6 is sent out by setting the relay apparatus 4 as the destination. By exchanging these messages, it is specified that the already established path between the relay apparatuses 4 and 6 be used, and that the L2 label B be used as the label of the L2 path to be established above it. A new L1 path is set up between the relay apparatuses 1 and 4 (FIG. 8) in the same manner as when the path is set up between the relay apparatuses 4 and 6 in the foregoing embodiment.

Figure 9:
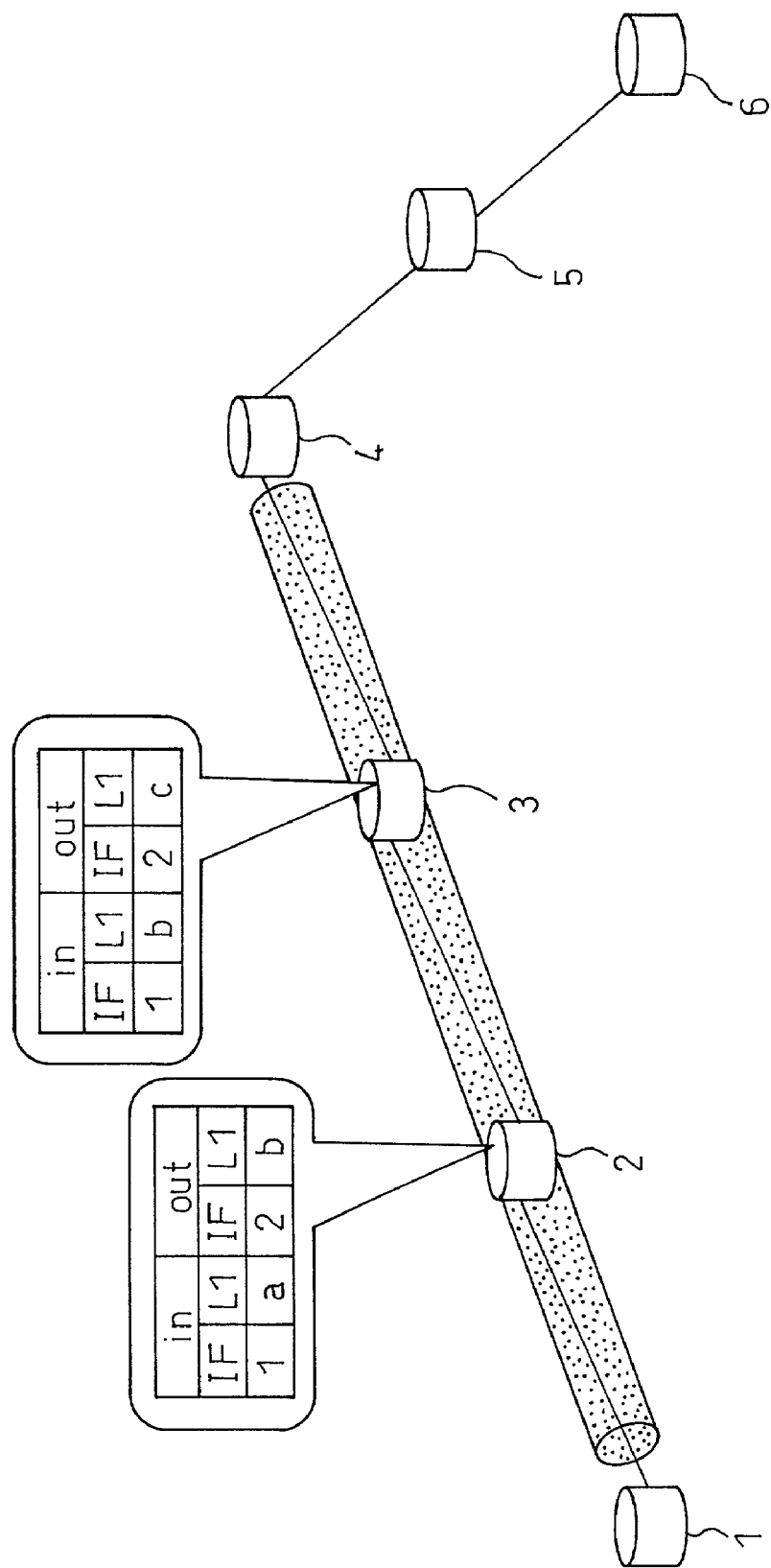
FIG. 9 is a diagram showing a condition before a path is set up in one example of a path setup procedure according to a third embodiment of the present invention.
Figure 10:
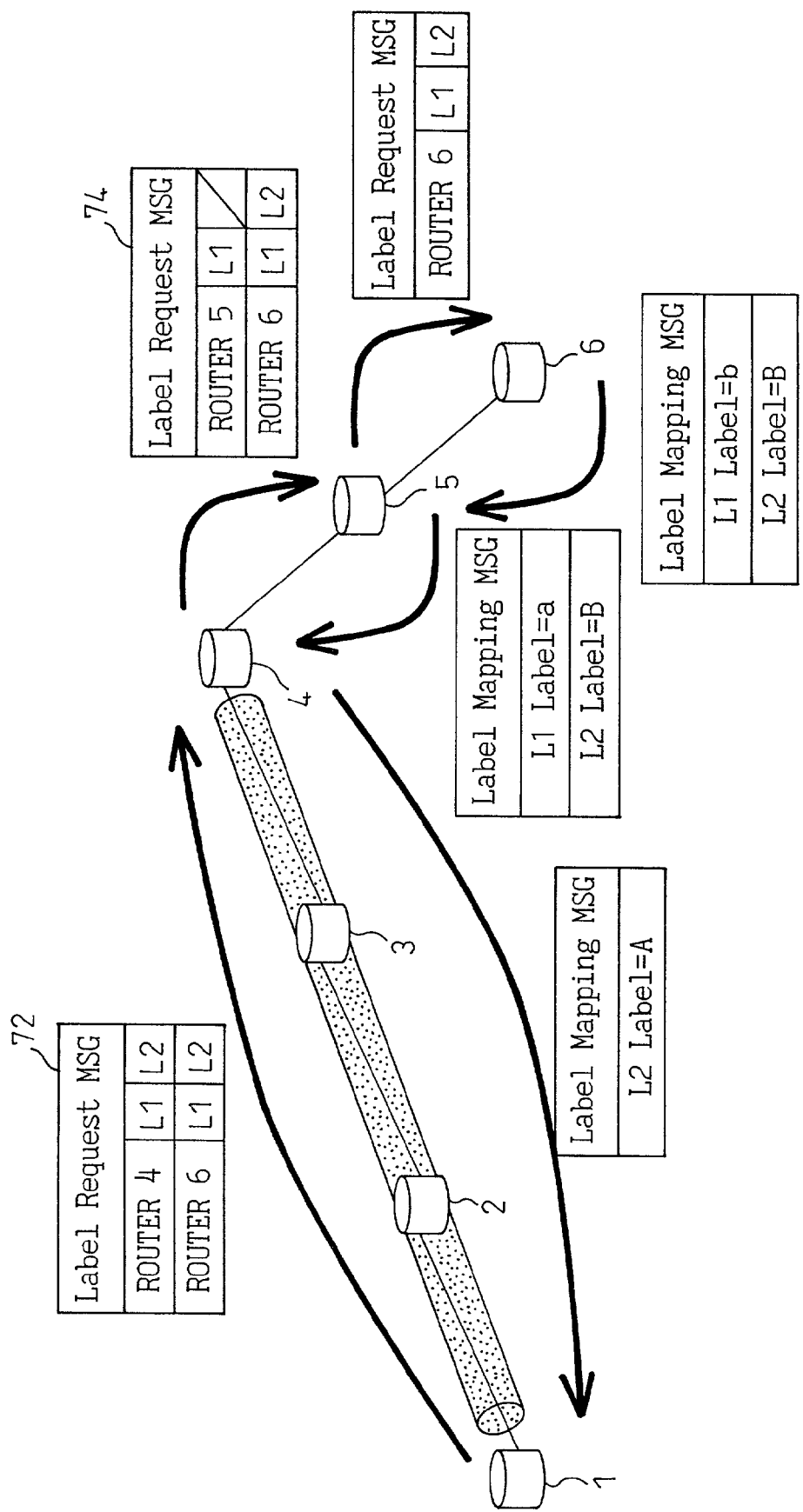
FIG. 10 is a diagram for explaining how label request and label mapping messages are transferred in one example of the path setup procedure according to the third embodiment of the present invention.
Figure 11:
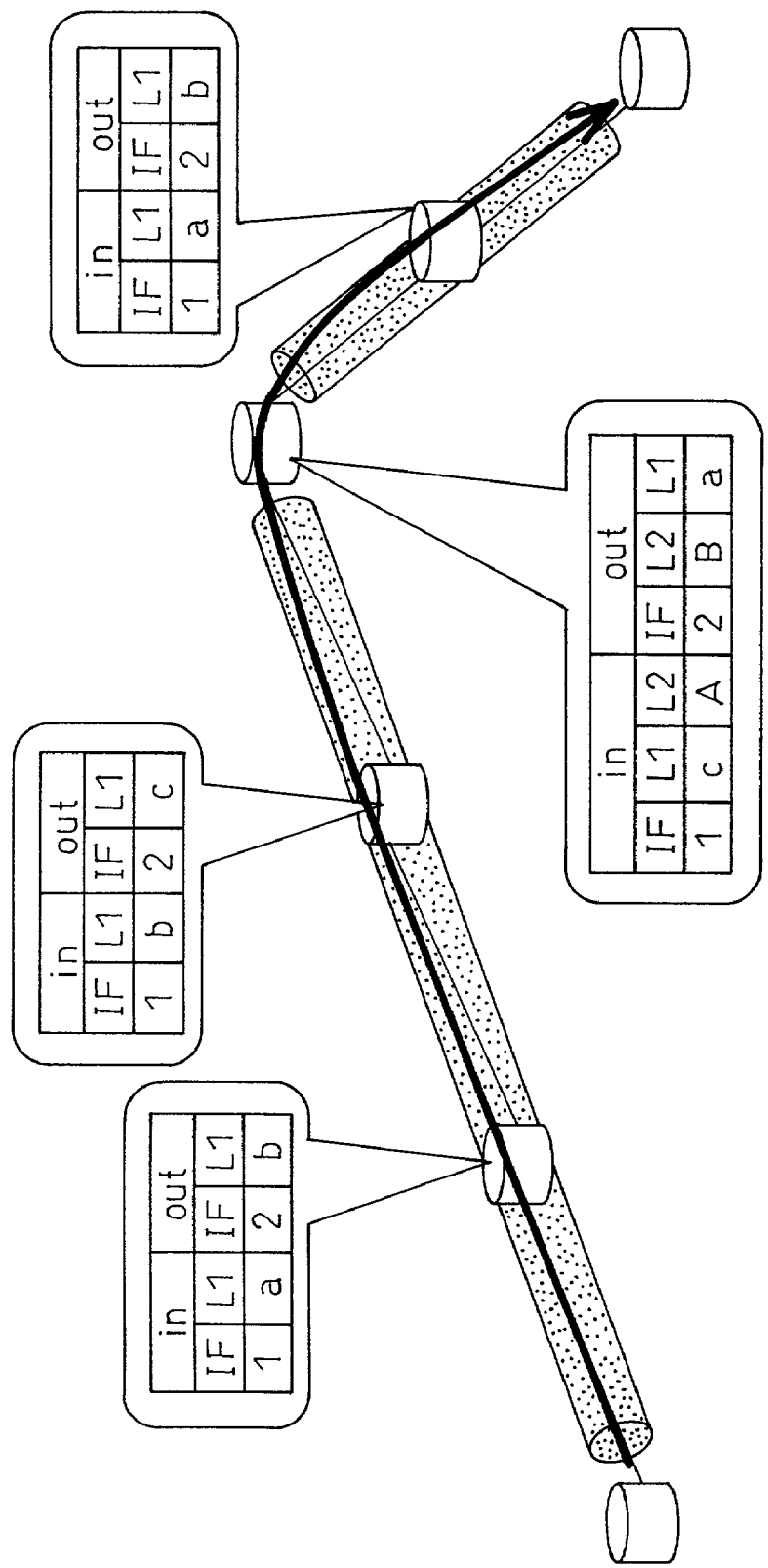
FIG. 11 is a diagram showing a condition after the path has been set up in one example of the path setup procedure according to the third embodiment of the present invention.

FIGS. 9 to 11 are diagrams for explaining a path setup procedure according to a third embodiment of the layer-structured path setup method of the present invention: FIGS. 9, 10, and 11 respectively correspond to FIGS. 3, 4, and 5 in the first embodiment.

In the first and second embodiments, the intermediate and end points of all the paths of all the layers are determined at the relay apparatus 1, i.e., the start point of the highest-layer path, and the thus determined information is included as a label request in the label request message, but the third embodiment differs in that at the start point of each path of each layer, the intermediate points along that path are determined and a label request is generated accordingly.

More specifically, as shown in FIG. 10, the route of an L1 path and the intermediate points along an L2 path, each to be set up with the relay apparatus 1 as the start point, are determined at the relay apparatus 1 and, since the L1 path to be set up with the relay apparatus 1 as the start point is already established, a label request message 72 is sent out as a packet addressed to the relay apparatus 4, as in the second embodiment. Alternatively, a label request message containing the label of the already established path may be transmitted, as in the first embodiment. The relay apparatus 4 that received the label request message 72 sets up a new L1 path to the relay apparatus 6 because there is no L1 path established between the relay apparatuses 4 and 6. At this time, the relay apparatus 4 determines the relay apparatus 5 as an intermediate point of the L1 path, and transmits a label request message 74 containing a notification specifying the relay apparatus 5 as an intermediate point. The operation thereafter is the same as that in the first or second embodiment.

Figure 12:
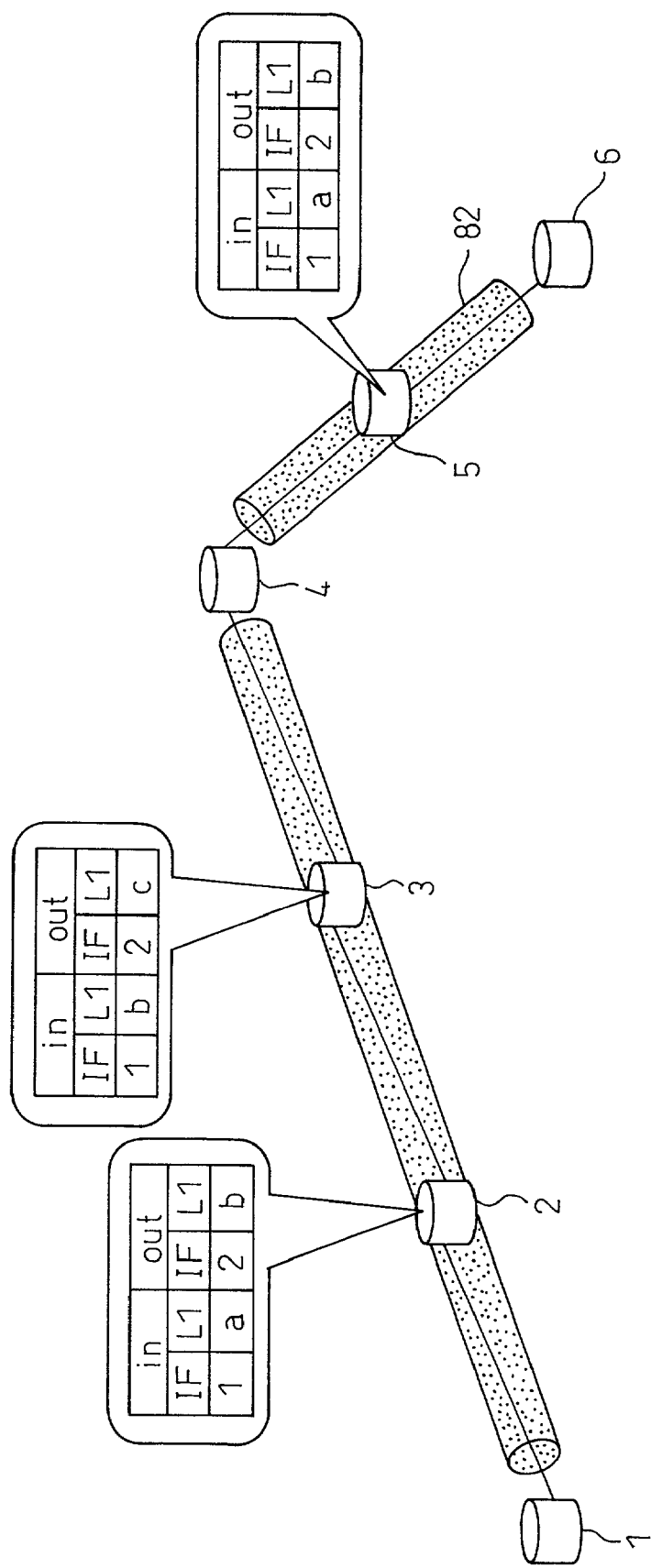
FIG. 12 is a diagram showing a condition before a path is set up in one example of a path setup procedure according to a fourth embodiment of the present invention.
Figure 13:
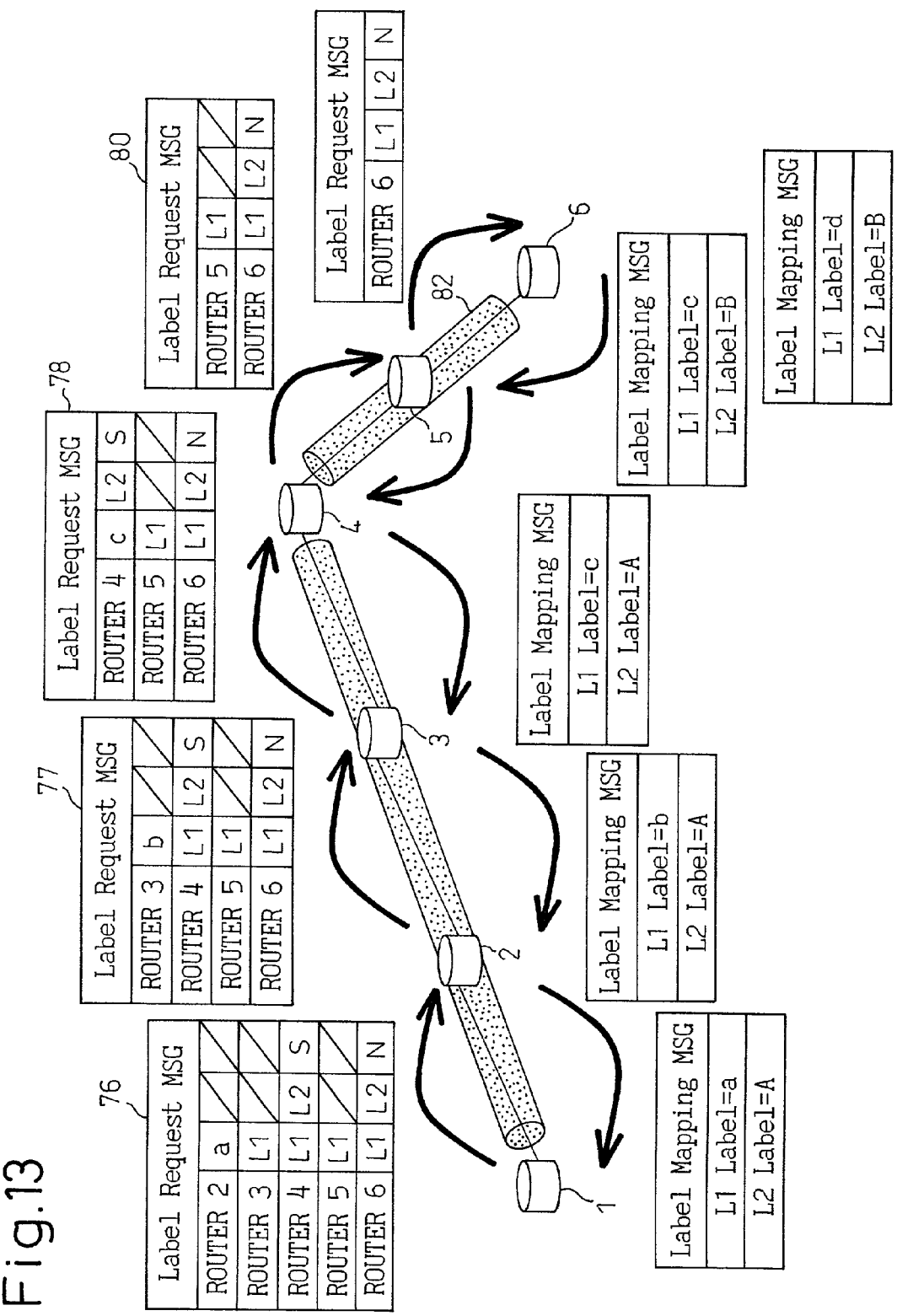
FIG. 13 is a diagram for explaining how label request and label mapping messages are transferred in one example of the path setup procedure according to the fourth embodiment of the present invention.
Figure 14:
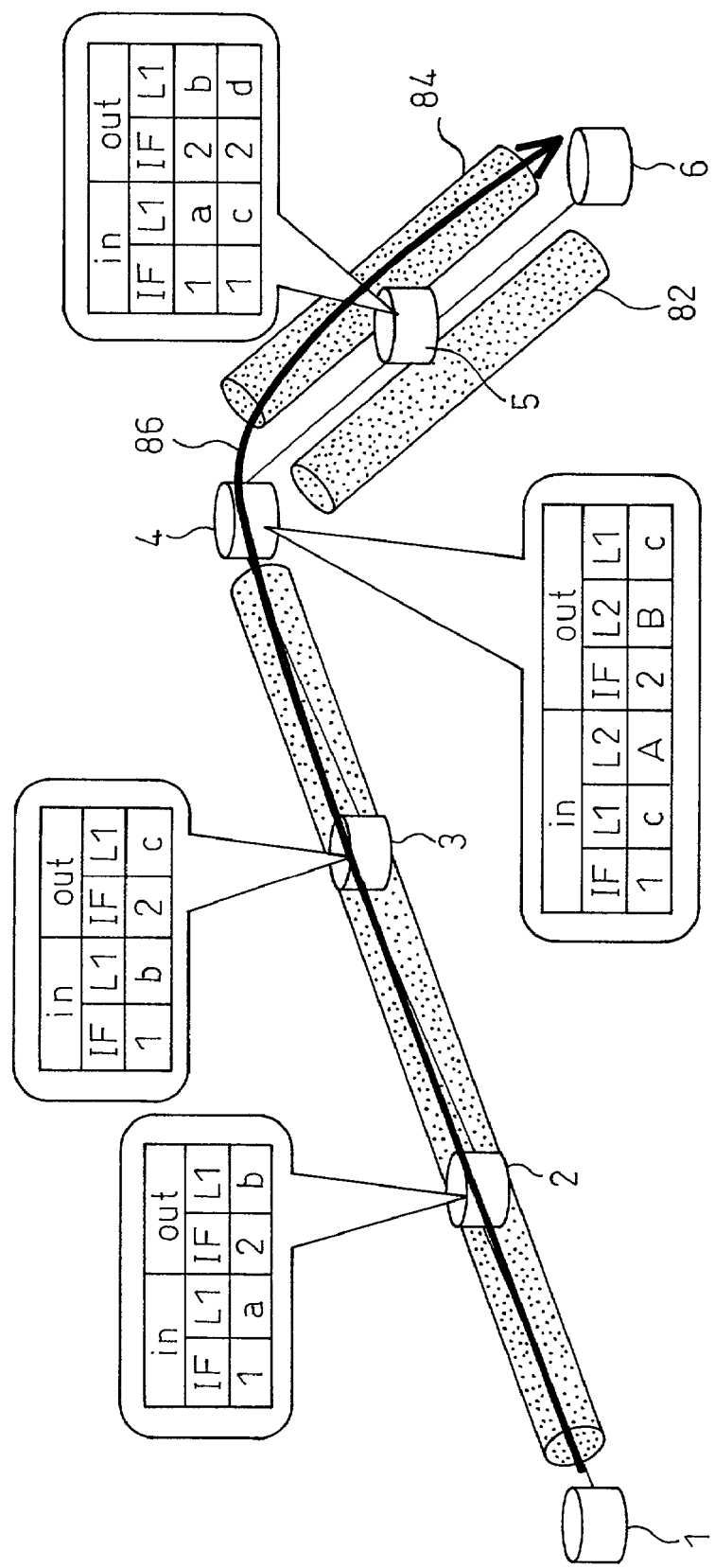
FIG. 14 is a diagram showing a condition after the path has been set up in one example of the path setup procedure according to the fourth embodiment of the present invention.

FIGS. 12 to 14 are diagrams for explaining a path setup procedure according to a fourth embodiment of the layer-structured path setup method of the present invention: FIGS. 12, 13, and 14 respectively correspond to FIGS. 3, 4, and 5 in the first embodiment.

In the embodiments described so far, no mention has been made of the decision as to whether to use or not use an already established path if there is already such a path along the route of the path to be set up; in contrast, in the fourth embodiment, the label request message sent out from the relay apparatus 1 at the start point of the highest-layer path carries an instruction for each path as to whether to permit or not permit the use of an established path if such a path already exists.

More specifically, in FIG. 13, the label request message 76 sent out from the relay apparatus 1 carries for each path an instruction "S", meaning that the use of an already established path is permitted, or an instruction "N", meaning that the setting up of a new path is requested even if there is an already established path. As shown in the figure, for example, these specifications are stored as the attributes of the relay apparatuses 4 and 6 at the end points of the respective L1 paths.

The relay apparatuses 2 and 3 send out label request messages 77 and 78 in sequence, and the relay apparatus 4 that received the label request message 78 recognizes that it is requested to set up an L1 path to the relay apparatus 6 with the relay apparatus 5 as an intermediate point, and that an instruction "N" is set for that path. Then, the relay apparatus 4 sends a label request message 80 to the relay apparatus 5, requesting a new label despite the existence of the path 82 already established between the relay apparatuses 4, 5, and 6. As a result, a new L1 path 84 is set up in addition to the already established L1 path 82 between the relay apparatuses 4, 5, and 6, and an L2 path 86 is set up above these L1 paths, as shown in FIG. 14.

Figure 15:
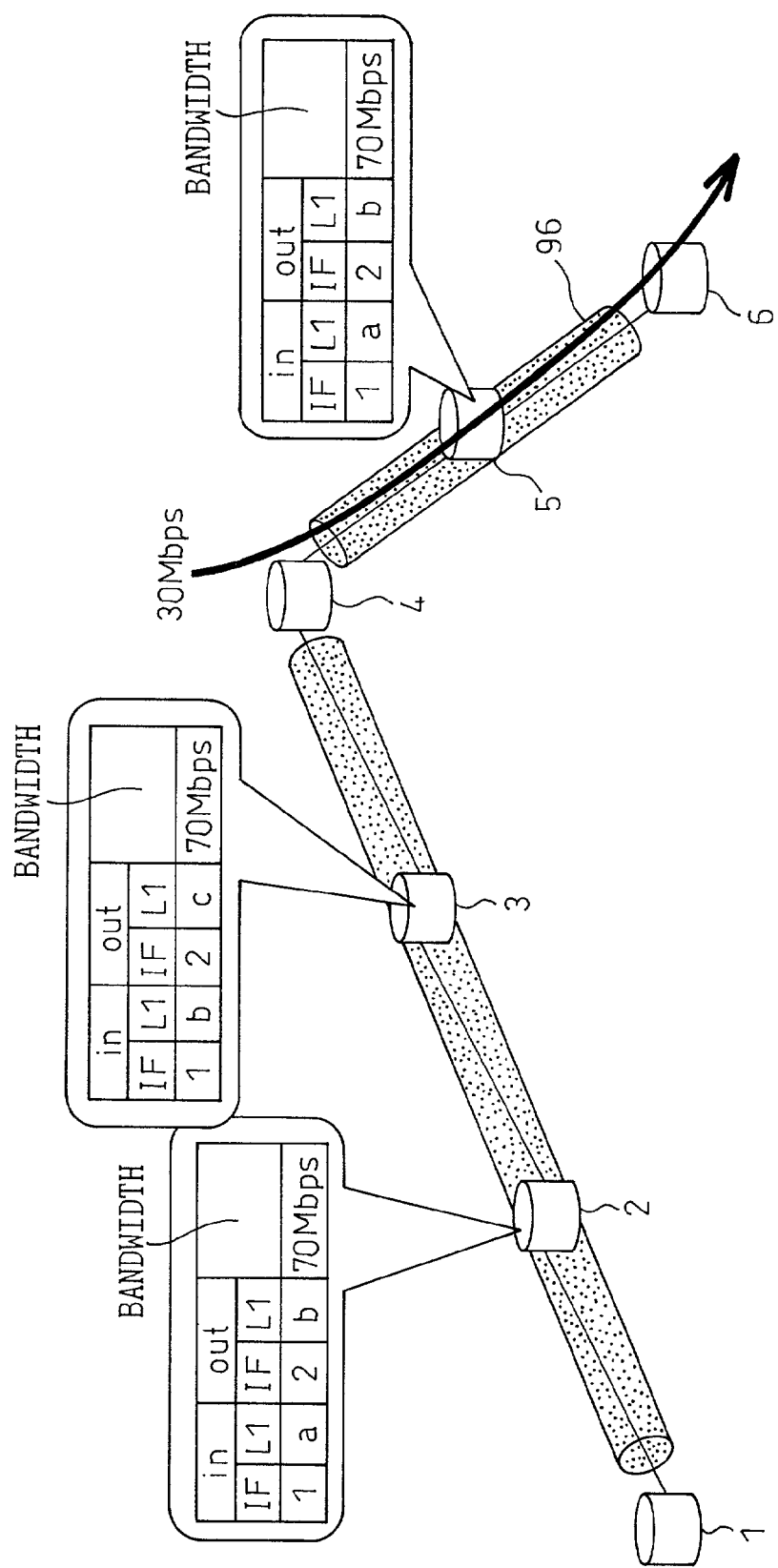
FIG. 15 is a diagram showing a condition before a path is set up in one example of a path setup procedure according to a fifth embodiment of the present invention.
Figure 16:
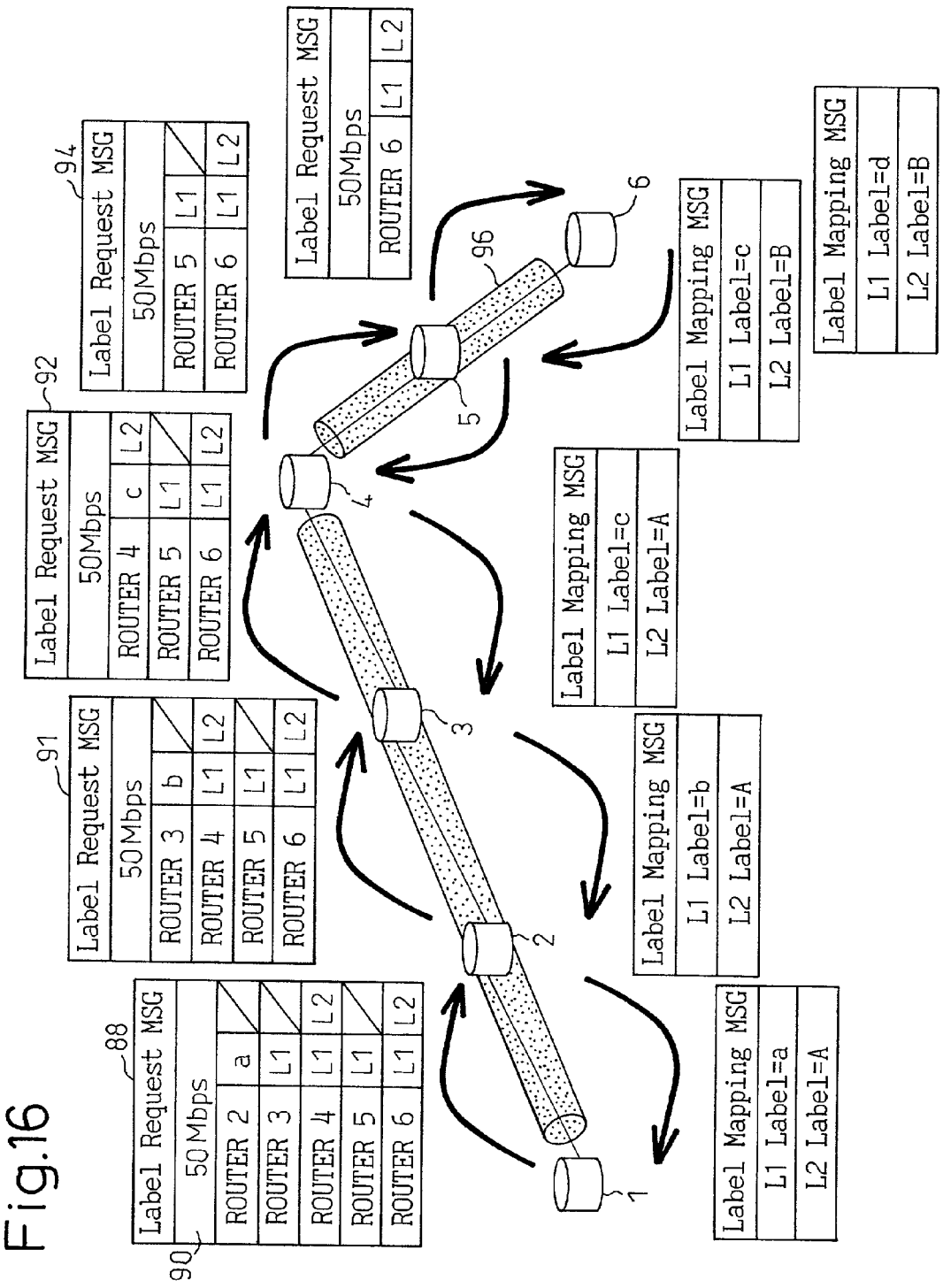
FIG. 16 is a diagram for explaining how label request and label mapping messages are transferred in one example of the path setup procedure according to the fifth embodiment of the present invention.
Figure 17:
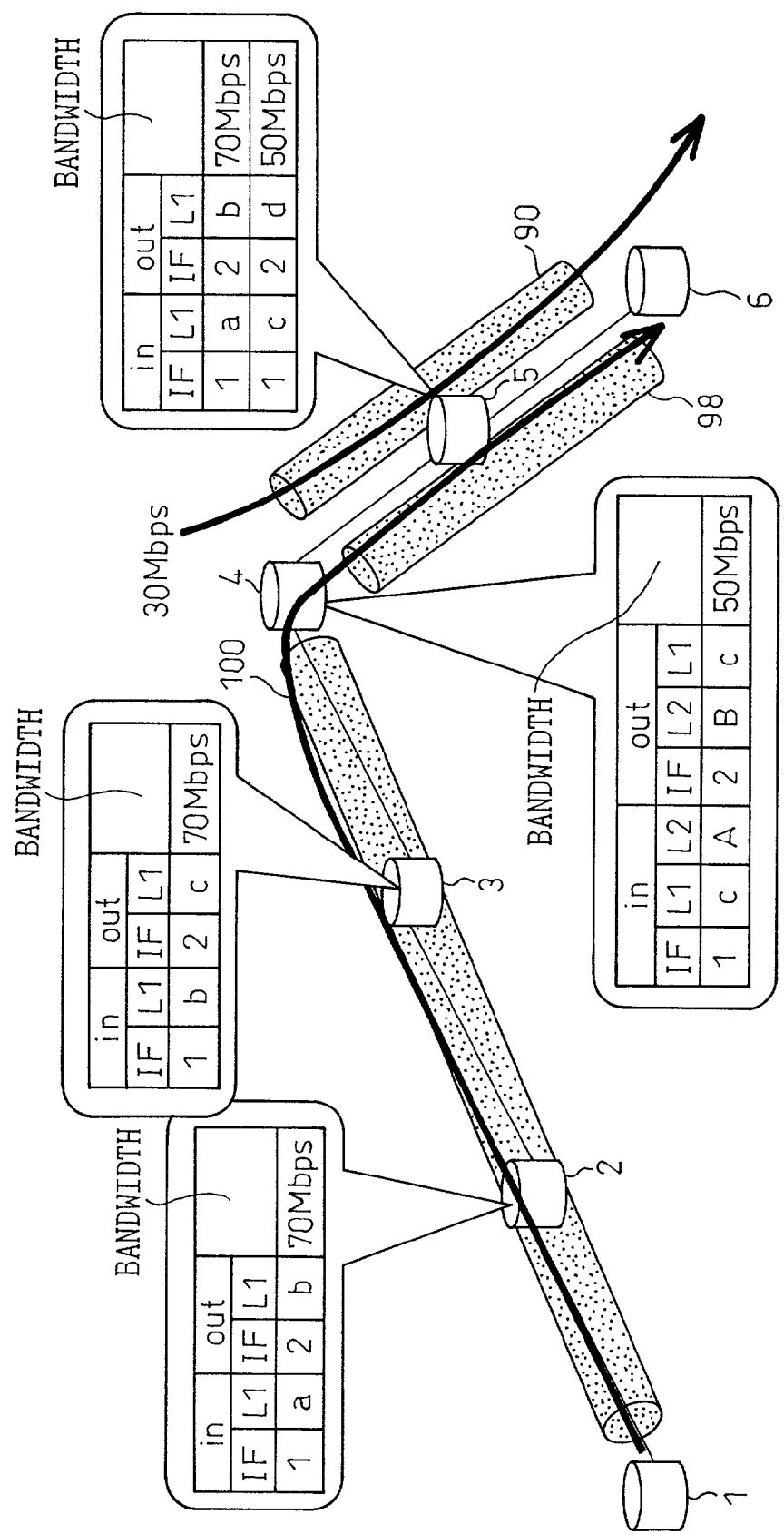
FIG. 17 is a diagram showing a condition after the path has been set up in one example of the path setup procedure according to the fifth embodiment of the present invention.

FIGS. 15 to 17 are diagrams for explaining a path setup procedure according to a fifth embodiment of the layer-structured path setup method of the present invention: FIGS. 15, 16, and 17 respectively correspond to FIGS. 3, 4, and 5 in the first embodiment.

In the example shown in FIG. 15, an L1 path with a bandwidth of 70 Mbps is established between the relay apparatuses 1, 2, 3, and 4, while an L1 path with a bandwidth of 70 Mbps is established between the relay apparatuses 4, 5, and 6; here, the L1 path between the relay apparatuses 4, 5, and 6 is used by an already established L2 path of 30 Mbps.

As shown in FIG. 16, in the fifth embodiment, the label request message 88 sent out from the relay apparatus 1 at the start point of the highest-layer path to be set up carries a bandwidth value 90, in this example, specified as "50 Mbps", indicating the bandwidth required by the path to be set up. Here, since the available bandwidth on the L1 path between the relay apparatuses 1 and 4 is 70 Mbps, this bandwidth can be used; therefore, the L1 label a of that path is included in the label request message 88.

The relay apparatuses 2 and 3 send out label request messages 91 and 92 in sequence, and the relay apparatus 4 that received the label request message 92 determines whether or not the already established L1 path can be used for the L1 path requested to be set up with the relay apparatus 4 as the start point. The bandwidth of the L1 path already established between the relay apparatuses 4, 5, and 6 is 70 Mbps, of which 30 Mbps is used by another L2 path, leaving 40 Mbps available for use. Since this available bandwidth is smaller than the required bandwidth of 50 Mbps, the relay apparatus 4 sends a label request message 94 requesting to set up a new L1 path between the relay apparatuses 4, 5, and 6. With this request, an L1 path 98 is set up between the relay apparatuses 4, 5, and 6 in addition to the existing L1 path 96, as shown in FIG. 17, and a new L2 path 100 is set up above the new L1 path.

Figure 18:
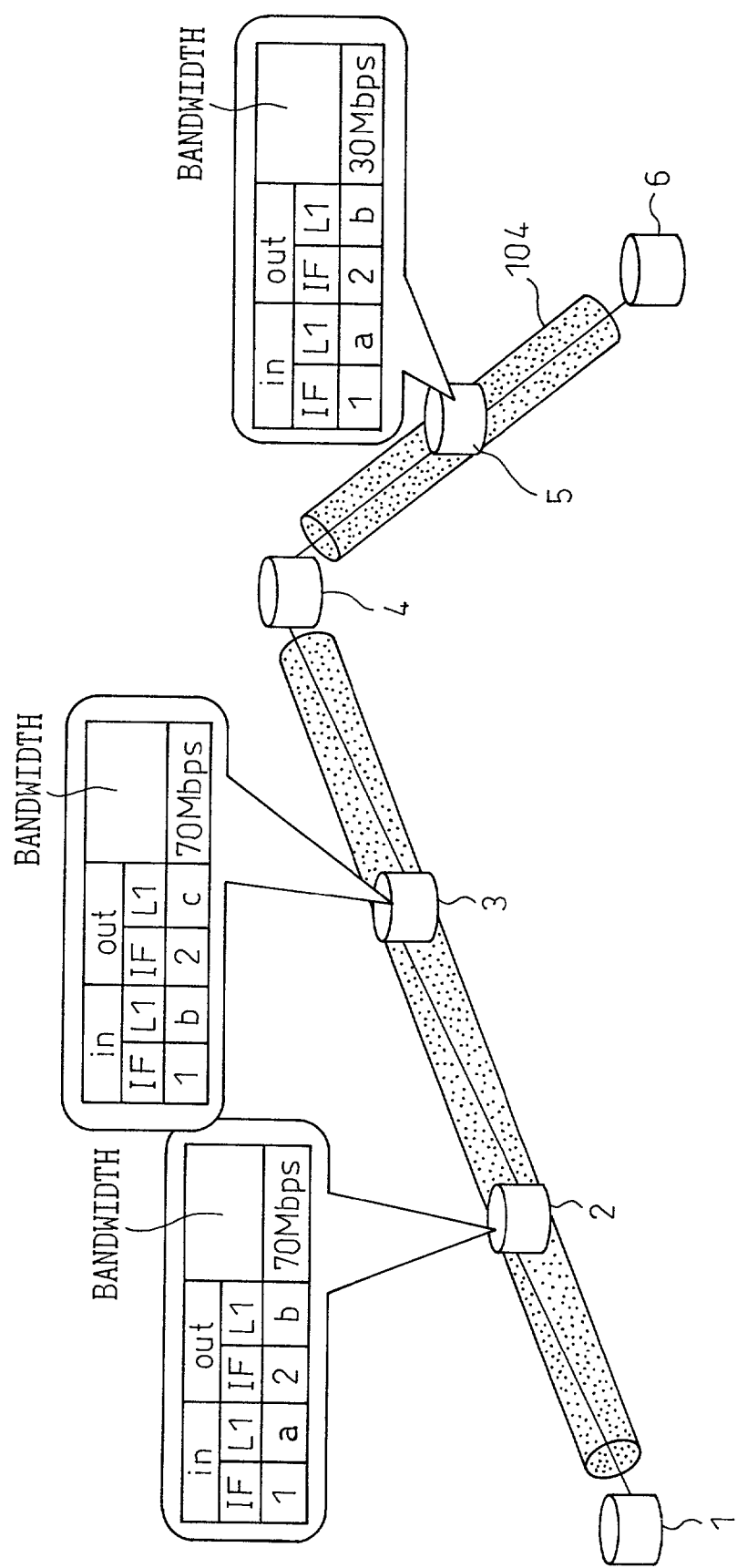
FIG. 18 is a diagram showing a condition before a path is set up in one example of a path setup procedure according to a sixth embodiment of the present invention.
Figure 19:
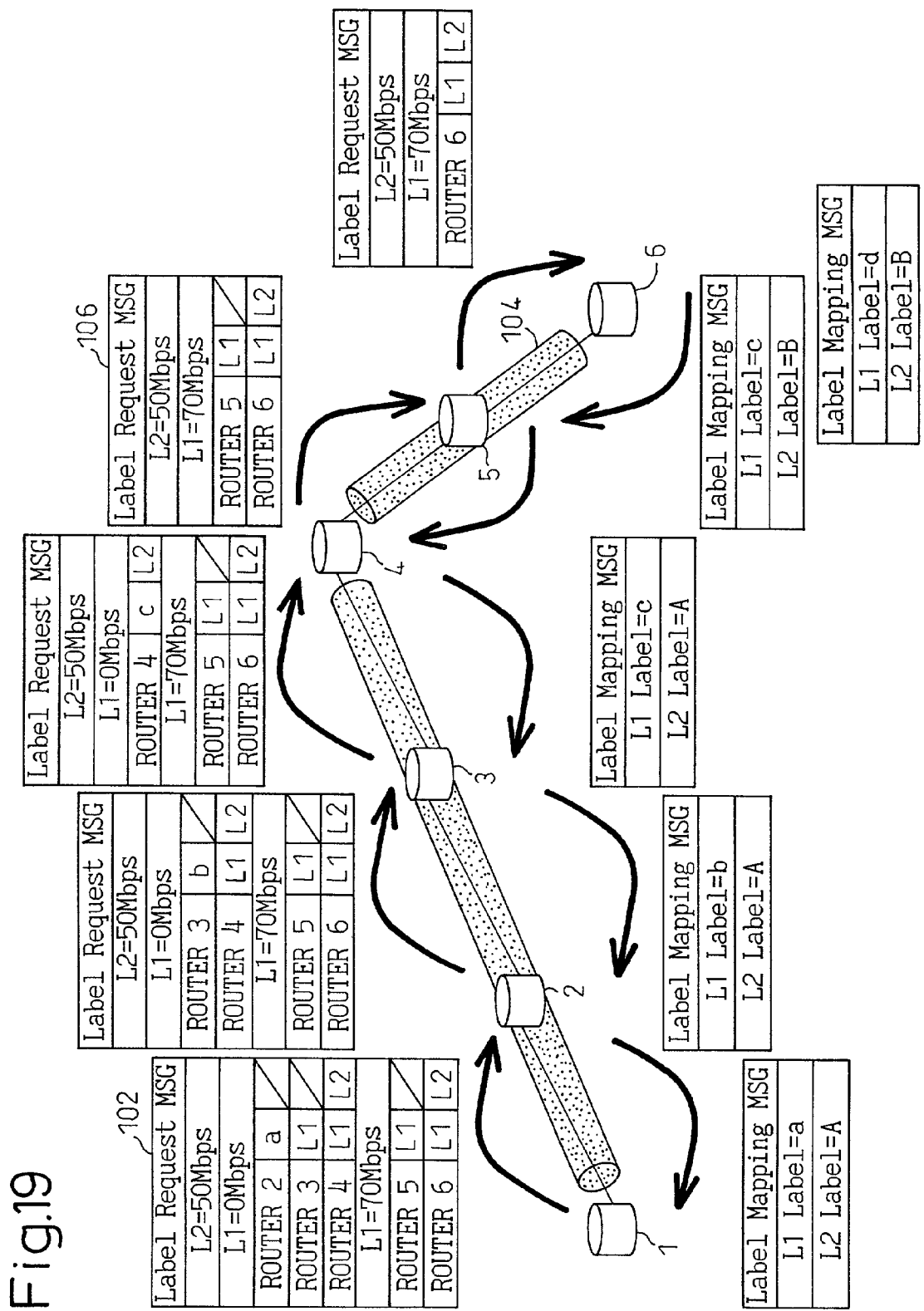
FIG. 19 is a diagram for explaining how label request and label mapping messages are transferred in one example of the path setup procedure according to the sixth embodiment of the present invention.
Figure 20:
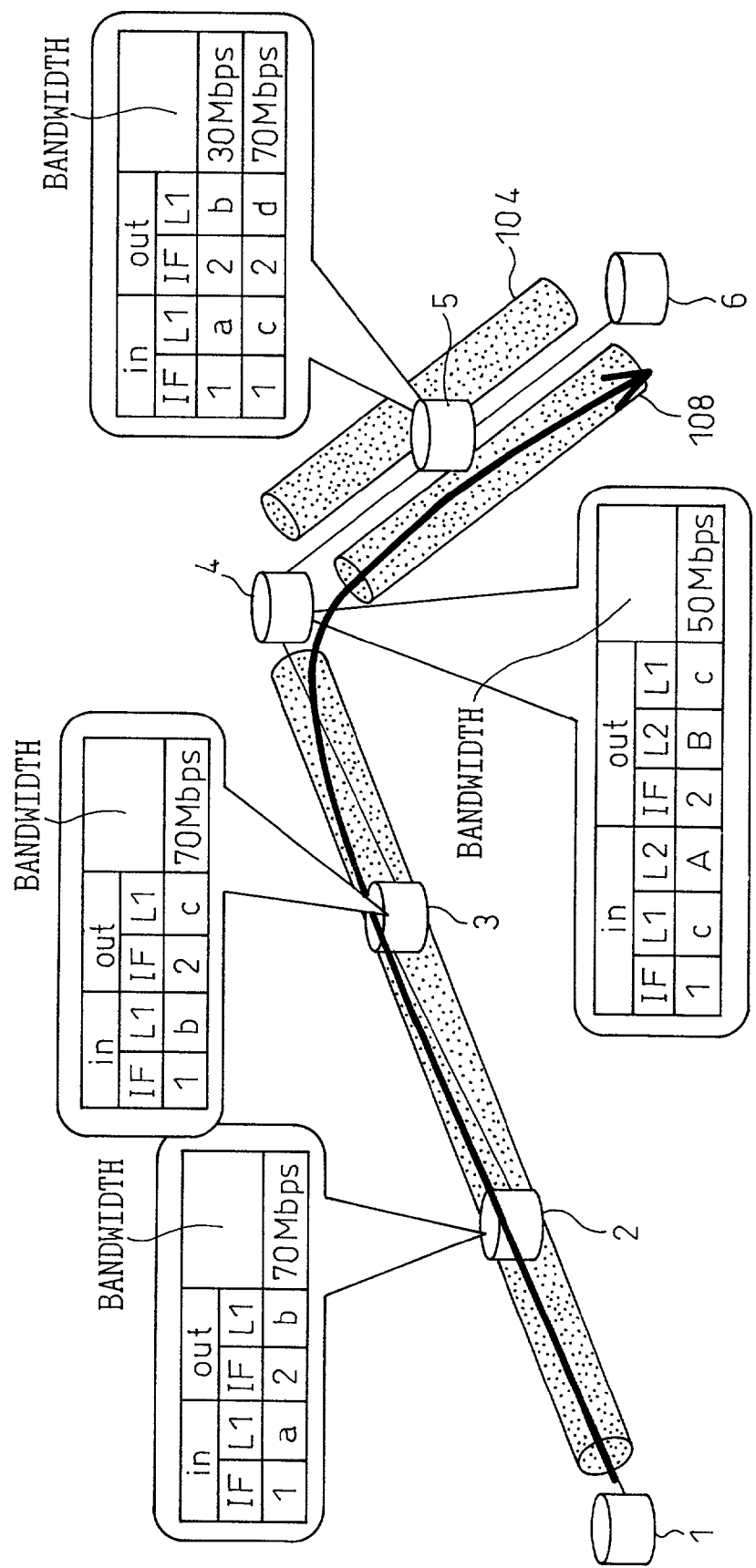
FIG. 20 is a diagram showing a condition after the path has been set up in one example of the path setup procedure according to the sixth embodiment of the present invention.

FIGS. 18 to 20 are diagrams for explaining a path setup procedure according to a sixth embodiment of the layer-structured path setup method of the present invention: FIGS. 18, 19, and 20 respectively correspond to FIGS. 3, 4, and 5 in the first embodiment.

As shown in FIG. 18, an L1 path with a bandwidth of 70 Mbps is already set up between the relay apparatuses 1, 2, 3, and 4, while an L1 path with a bandwidth of 30 Mbps is already set up between the relay apparatuses 4, 5, and 6.

As shown in FIG. 19, the label request message 102 sent out from the relay apparatus 1 carries values designating the required bandwidths of the paths of the respective layers. In the illustrated example, the L2 path to be set up between the relay apparatuses 1, 4, and 6 requires 50 Mbps, the L1 path to be set up between the relay apparatuses 1, 2, 3, and 4 requires 0 Mbps, and the L1 path to be set up between the relay apparatuses 4, 5, and 6 requires 70 Mbps. The required bandwidth of 0 Mbps means that the existing path may be used regardless of the amount of the available bandwidth.

Accordingly, the label request message 102 sent out from the relay apparatus 1 contains the label a of the already established L1 path to allow the use of that L1 path. The available bandwidth on the existing L1 path 104 between the relay apparatuses 4, 5, and 6 is 30 Mbps which is smaller than the required bandwidth of 70 Mbps; therefore, the relay apparatus 4 sends out a label request message 106 requesting a new label. As a result, a new L1 path 108 is set up between the relay apparatuses 4, 5, and 6 in addition to the existing L1 path 104, as shown in FIG. 20.

Figure 21:
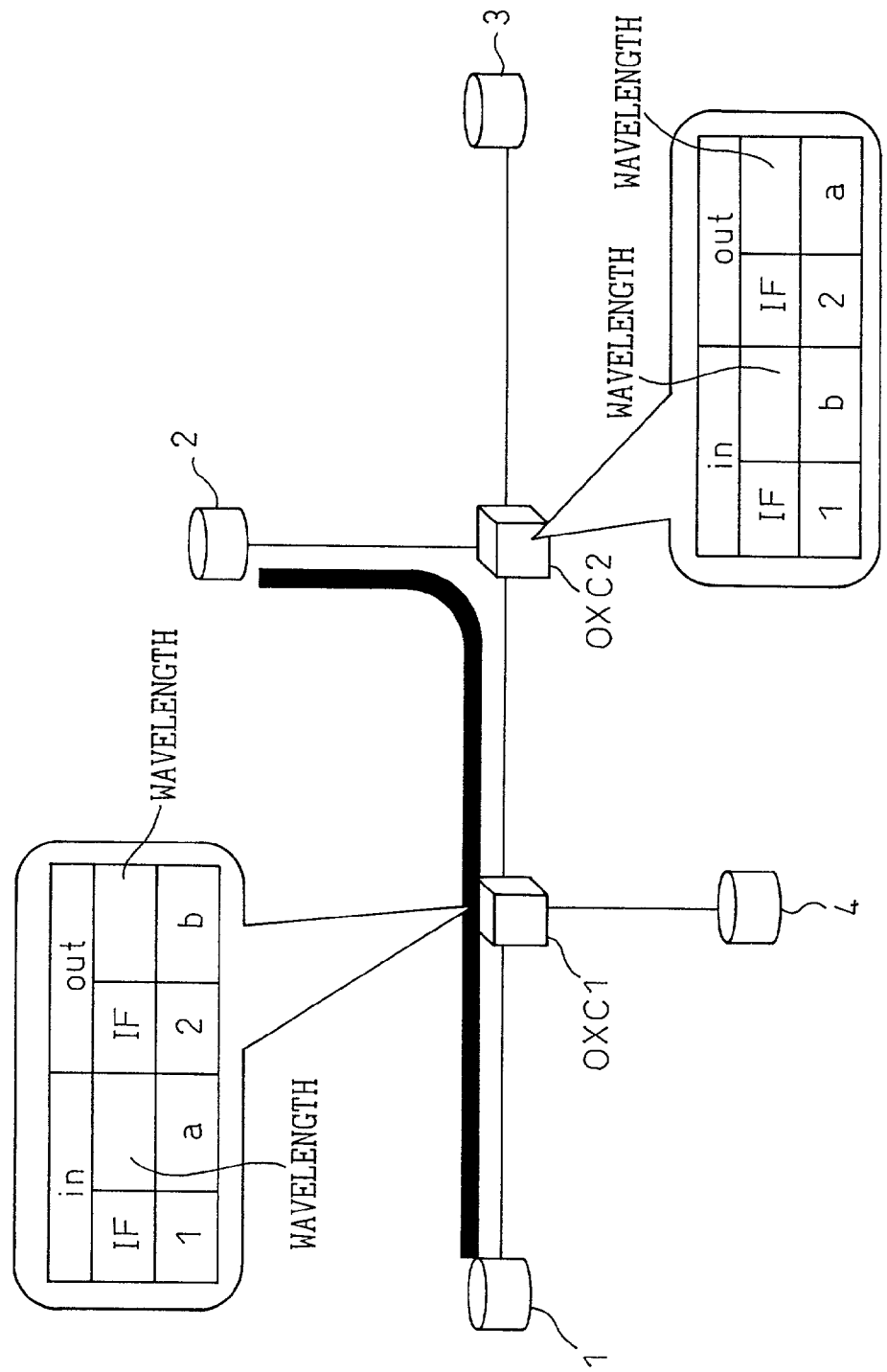
FIG. 21 is a diagram showing a condition before a path is set up in one example of a path setup procedure according to a seventh embodiment of the present invention.
Figure 22:
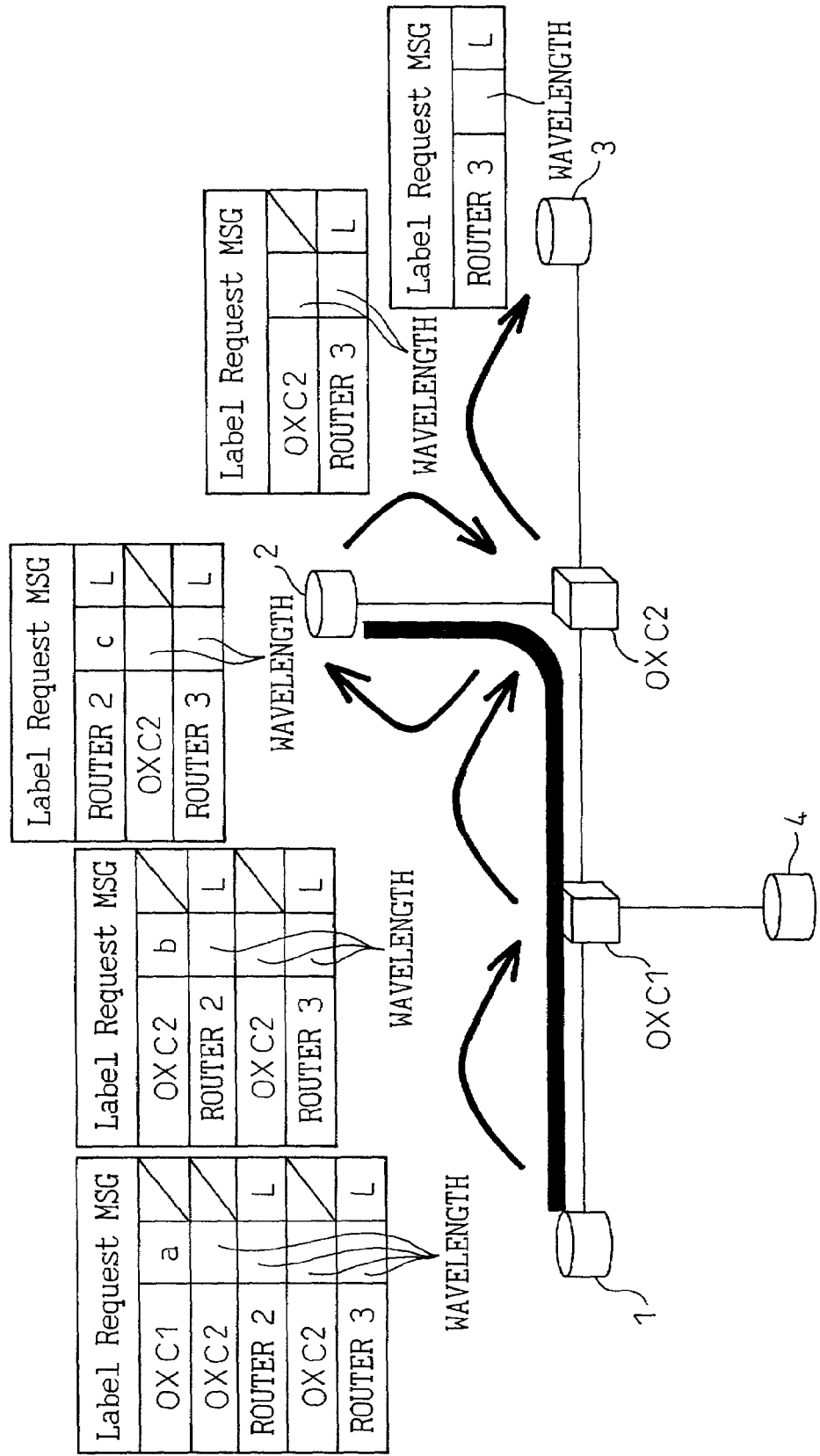
FIG. 22 is a diagram for explaining how a label request message is transferred in one example of the path setup procedure according to the seventh embodiment of the present invention.
Figure 23:
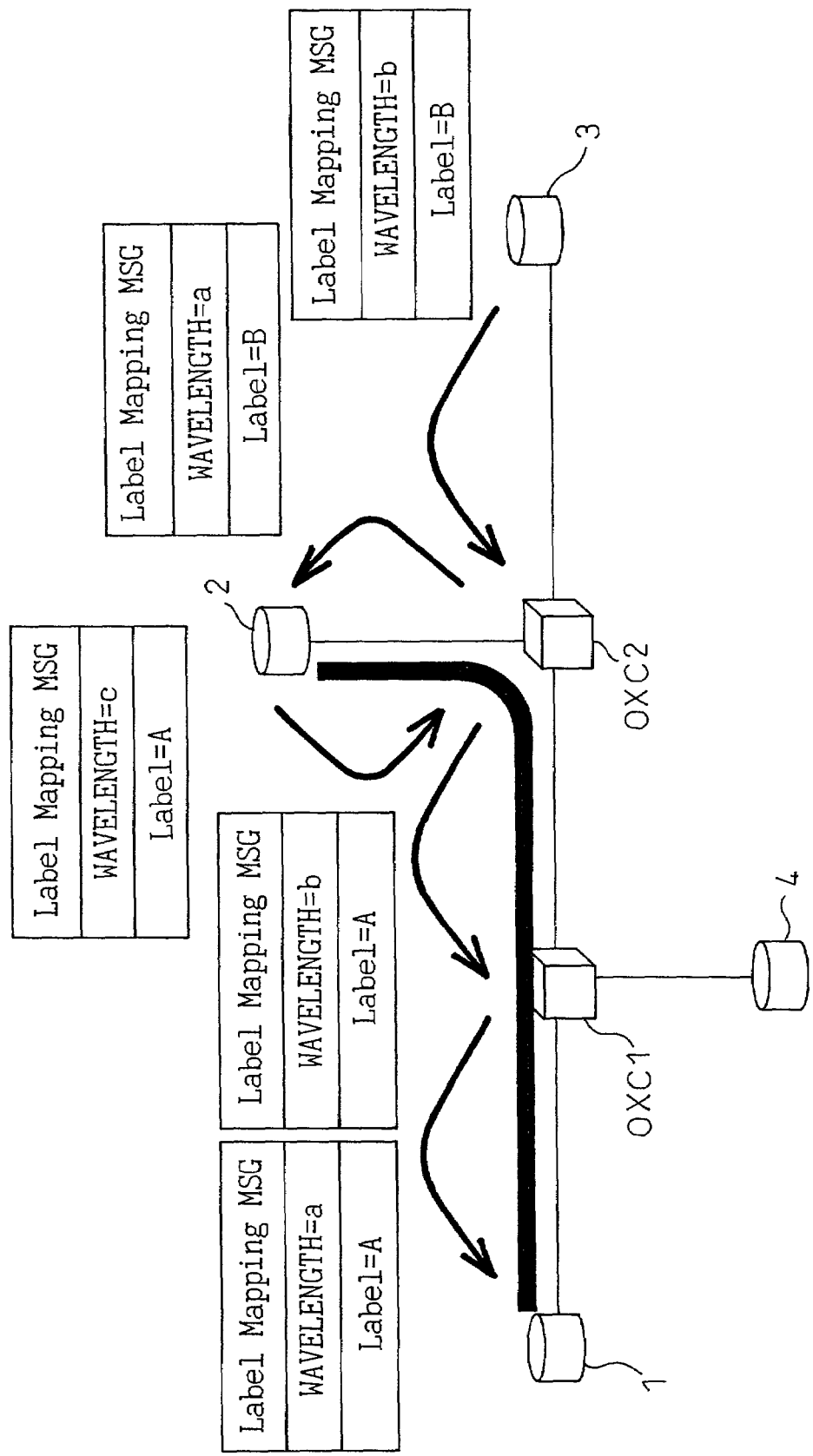
FIG. 23 is a diagram for explaining how a label mapping message is transferred in one example of the path setup procedure according to the seventh embodiment of the present invention.
Figure 24:
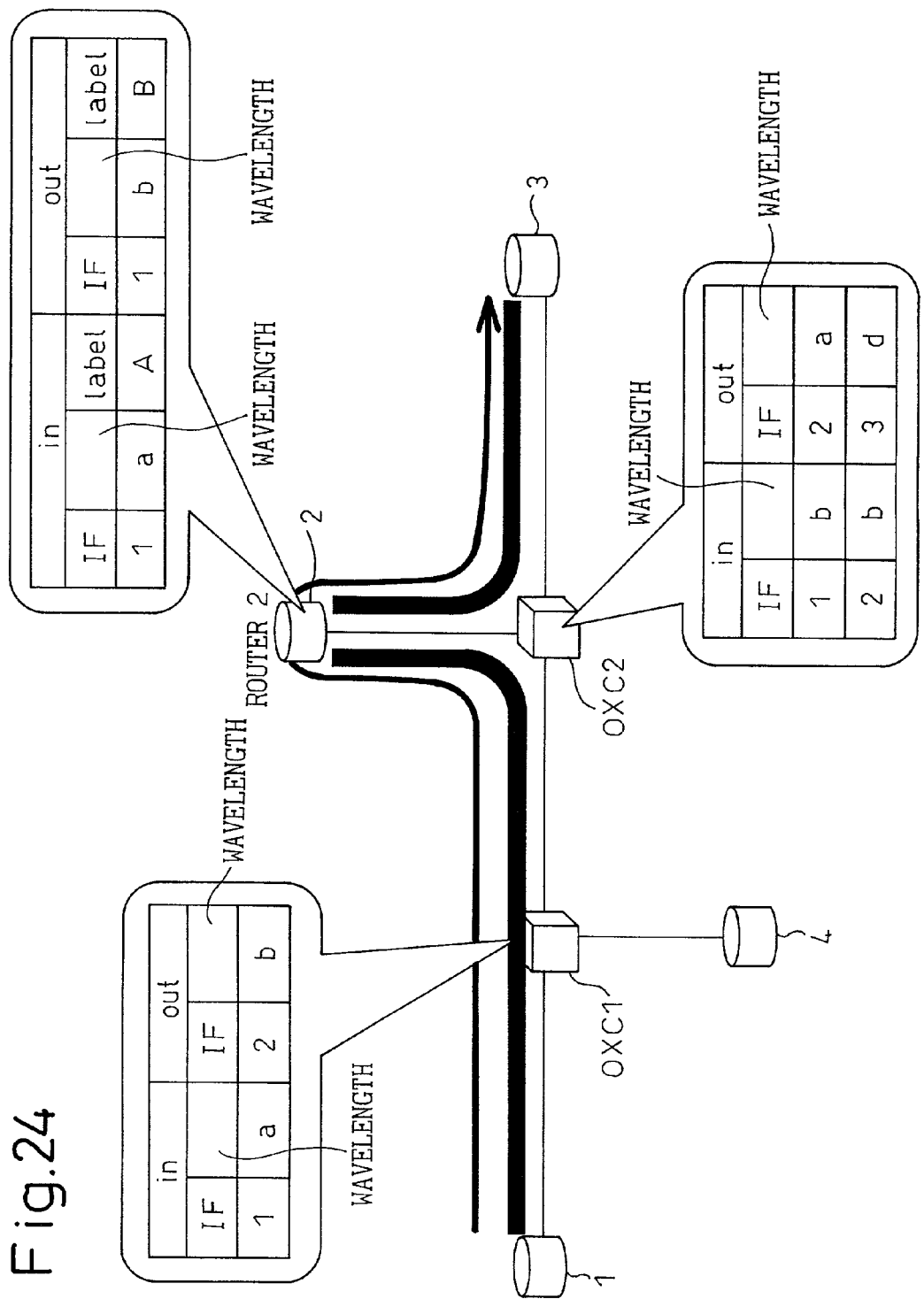
FIG. 24 is a diagram showing a condition after the path has been set up in one example of the path setup procedure according to the seventh embodiment of the present invention.

FIGS. 21 to 24 are diagrams for explaining a path setup procedure according to a seventh embodiment of the layer-structured path setup method of the present invention: FIG. 21 corresponds to FIG. 3, FIGS. 22 and 23 correspond to FIG. 4, and FIG. 24 corresponds to FIG. 5.

In this embodiment, the lowest layer path is an optical wavelength path using OXCs and WDM, and an MPLS path is set up above it. If the optical wavelength path is replaced by an L1 path, the MPLS path by an L2 path, and the relay apparatus 1, OXC 1, OXC 2, relay apparatus 2, OXC 2, and relay apparatus 3 by the relay apparatuses 1 to 6, respectively, then the configuration is identical to that shown in the diagrams of the first embodiment. That is, the path setup procedure is the same as that of the first embodiment, but it will be appreciated that the same path setup procedures as those of the second to sixth embodiments are also applicable.

Figure 25:
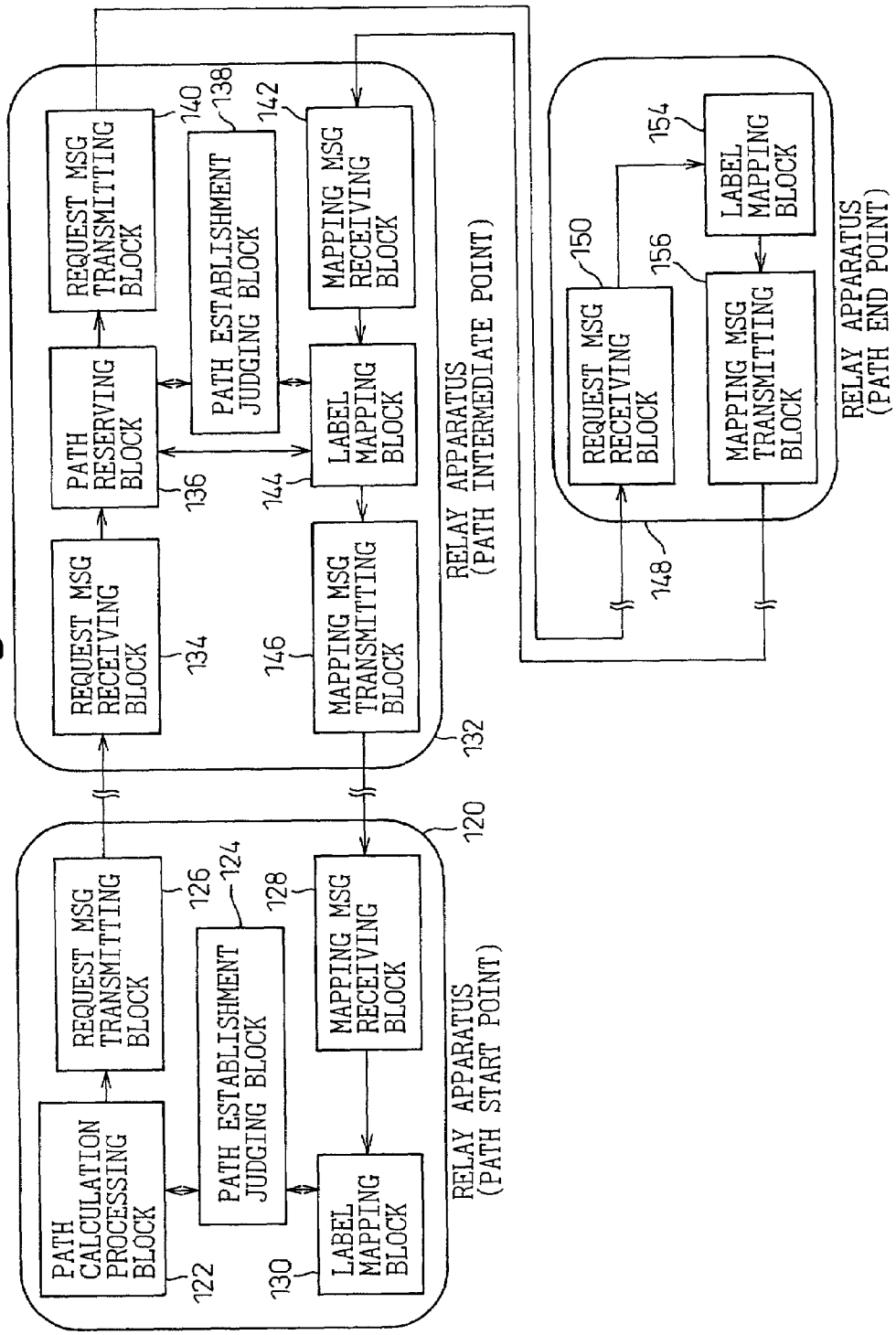
FIG. 25 is a diagram showing the configuration of relay apparatuses according to one embodiment of the present invention.

FIG. 25 shows the configuration of each relay apparatus for implementing the layer-structured path setup method of the present invention.

The functional blocks necessary for the path start-point apparatus, i.e., the relay apparatus 120 that sends out a path setup request, are a path calculation processing block 122, a path establishment judging block 124, a request MSG transmitting block 126, a mapping MSG receiving block 128, and a label mapping block 130.

The path calculation processing block 122 computes the relay apparatuses through which the layer-structured path is routed. It also specifies the start-point, intermediate-point, and end-point relay apparatuses for the path of each layer. In the case of the earlier described third embodiment, the path calculation processing block 122 specifies the intermediate-point and end-point relay apparatuses only for the path whose start point is the current apparatus, and in the other embodiments, the node at the start point of the highest-layer path determines the intermediate-point and end-point relay apparatuses for the paths of all the layers. Alternatively, the specification may be entered from an external maintenance terminal.

For the layer-structured path computed by the path calculation block 122, the path establishment judging block 124 checks to determine whether the paths of the respective layers to be set up with the current relay apparatus as the start point are already established and, if any such path is already established, it then determines whether to use or not use the established path.

The request MSG transmitting block 126 stores, in the label request message, information relating to the start-point, intermediate-point, and end-point relay apparatuses of the path of each layer computed by the path calculation processing block 122 and information notifying that there is an already established path set up with the current relay apparatus as the start point. Then, it transmits the label request message to the next relay apparatus along the path.

The label mapping MSG receiving block 128 receives the label mapping message. The label mapping block 130 maps the labels specified in the received label mapping message to the respective paths.

The functional blocks necessary for a relay apparatus 132 located intermediately along the path are a request MSG receiving block 134, a path reserving block 136, a path establishment judging block 138, a request MSG transmitting block 140, a mapping MSG receiving block 142, a label mapping block 144, and a mapping MSG transmitting block 146.

The request MSG receiving block 134 receives the label request message. The path reserving block 136 stores the identity of the relay apparatus that transmitted the label request message, along with the label layers associated with the current relay apparatus 132 and carried in the label request message.

For the paths specified in the label request message, the path establishment judging block 138 checks to determine whether the paths of the respective layers to be set up with the current relay apparatus as the start point are already established and, if any such path is already established, then determines whether to use or not use the established path.

The request MSG transmitting block 140 stores, in the label request message to be transmitted, information relating to the relay apparatuses on the paths specified in the received label request message, excluding the current relay apparatus, and information relating to the layers for which the respective relay apparatuses are the start-point, intermediate-point, and end-point apparatuses, as well as information notifying that the already established path set up with the current relay apparatus as the start point or intermediate point should be used. Then, it transmits the label request message to the next relay apparatus along the path.

The label mapping MSG receiving block 142 receives the label mapping message. The label mapping block 144 maps the labels specified in the received label mapping message to the respective paths. New labels are mapped to all the paths of the layers stored in the path reserving block 136 in association with the current relay apparatus, except those paths for which the use of already established paths is specified.

The mapping MSG transmitting block 146 stores the layer labels mapped by the label mapping block 144 in the label mapping message. Then, it transmits the label mapping message to the relay apparatus that transmitted the label request message and whose identity is stored in the path reserving block 136.

The functional blocks necessary for the path end-point relay apparatus 148 are a request MSG receiving block 150, a label mapping block 154, and a mapping MSG transmitting block 156.

The request MSG receiving block 150 receives the label request message, and recognizes that the relay apparatus 148 is the end point of the path specified in the label request message.

The label mapping block 154 maps labels to the paths for which the mapping of new labels is requested.

The mapping MSG transmitting block 156 stores the labels mapped by the label mapping block 154 in the label mapping message. Then, it transmits the label mapping message to the relay apparatus that transmitted the label request message.

The invention claimed is:

1. A method of setting up a layer-structured path constructed from multiple layers of paths, comprising the steps of:
    (a) transmitting a first message from a start-point node to an end-point node of the highest-layer path, said first message carrying a label request for a plurality of layer paths;
    (b) mapping labels to the requested paths at each node in response to said label request;
    (c) transmitting a second message from the end-point node to the start-point node of said highest-layer path in response to said first message, thereby reporting by means of said second message the labels mapped in said step (b); and
    (d) storing said reported labels at each node.

2. A method according to claim 1, further comprising the step of (e) determining, at a start-point node of each path of each layer, whether to set up a new path or to use an already established path, after receiving said first message but before sending out said first message.

3. A method according to claim 2 wherein, when it is determined in said step (e) that an already established path should be used rather than setting up a new path, said first message transmitted in said first step (a) contains an instruction to use said already established path.

4. A method according to claim 2 wherein, when it is determined in said step (e) that an already established path should be used rather than setting up a new path, said first message transmitted in said first step (a) is addressed to an end-point of said already established path.

5. A method according to claim 1, further comprising the step of (f) determining a relay point for each path of each layer at the start-point node of said each path of each layer.

6. A method according to claim 1, further comprising the step of (f) determining relay points for all the paths at the start-point node of said highest-layer path.

7. A method according to claim 6, wherein
    said label request contains an instruction as to whether to permit or not to permit the use of an already established path for each path of each layer, and
    when the use of an already established path is permitted, and when said already established path exists, then it is determined in said step (e) that said already established path should be used.

8. A method according to claim 6, wherein
    said label request contains specification of a required bandwidth, and
    when said already established path exists, and when available bandwidth on said already established path is not smaller than said required bandwidth, then it is determined in said step (e) that said already established path should be used.

9. A method according to claim 6, wherein
said label request contains specification of a required bandwidth for each path of each layer, and
when said already established path exists, and when available bandwidth on said already established path is not smaller than the bandwidth specified as required for the requested path of the same layer as said already established path, then it is determined in said step (e) that said already established path should be used.

10. A method according to claim 1, wherein the label of any one of layer paths is an optical wavelength used.

11. A node apparatus for setting up a layer-structured path constructed from multiple layers of paths, comprising:
means for generating a first message which contains a label request for a plurality of layer paths, and which is transmitted to an end-point node of the highest-layer path;
means for transmitting said generated first message;
means for receiving a second message as a response to said first message; and
means for storing a label that is contained in said received second message as a response to said label request.

12. A node apparatus according to claim 11, further comprising means for determining whether to set up a new path, or to use an already established path, for a path about to be set up with its own node as a start point.

13. A node apparatus according to claim 12, wherein when said determining means determines that an already established path should be used rather than setting up a new path for the path about to be set up with its own node as the start point, said message generating means generates said first message by including therein an instruction to use said already established path.

14. A node apparatus according to claim 12 wherein, when said determining means determines that an already established path should be used rather than setting up a new path for the path about to be set up with its own node as the start point, said message generating means generates said first message by setting an end point of said already established path as an destination.

15. A node apparatus according to claim 11, further comprising means for determining a relay point only for the path about to be set up with its own node as the start point.

16. A node apparatus according to claim 11, further comprising means for determining relay points for all the paths of all the layers.

17. A node apparatus according to claim 16, wherein said label request contains a specification as to whether to permit or not to permit the use of an already established path for each path of each layer.

18. A node apparatus according to claim 16, wherein said label request contains specification of a required bandwidth.

19. A node apparatus according to claim 16, wherein said label request contains specification of a required bandwidth for each path of each layer.

20. A node apparatus according to claim 11, wherein the label of any one of layer paths is an optical wavelength used.

21. A node apparatus for setting up a layer-structured path constructed from multiple layers of paths, comprising:
means for receiving and then transmitting a first message that contains a label request for a plurality of layer paths, and that is being transferred from a start-point node to an end-point node of the highest-layer path;
means for mapping labels to the requested paths in response to said label request;
means for receiving a second message as a response to said first message, and for transmitting said second message by including therein the labels mapped by said mapping means; and
means for storing the labels contained in said received second message.

22. A node apparatus according to claim 21, further comprising means for determining whether to set up a new path, or to use an already established path, for a path about to be set up with its own node as a start point, said determination being made after receiving said first message but before sending out said first message.

23. A node apparatus according to claim 22, wherein when said determining means determines that an already established path should be used rather than setting up a new path for the path about to be set up with its own node as the start point, said first message receiving/transmitting means transmits said first message by including therein an instruction to use said already established path.

24. A node apparatus according to claim 22, wherein when said determining means determines that an already established path should be used rather than setting up a new path for the path about to be set up with its own node as the start point, said first message receiving/transmitting means transmits said first message by setting an end point of said already established path as an destination.

25. A node apparatus according to claim 21, further comprising means for determining a relay point for the path about to be set up with its own node as the start point.

26. A node apparatus according to claim 21, wherein relay points for all the paths of all the layers are determined at the start-point node of the highest-layer path.

27. A node apparatus according to claim 26, wherein
said label request contains an instruction as to whether to permit or not to permit the use of an already established path for each path of each layer, and
when the use of an already established path is permitted, and when said already established path exists, then said determining means determines that said already established path should be used.

28. A node apparatus according to claim 26, wherein
said label request contains specification of a required bandwidth, and
when said already established path exists, and when available bandwidth on said already established path is not smaller than said required bandwidth, then said determining means determines that said already established path should be used.

29. A node apparatus according to claim 26, wherein
said label request contains a specification of a required bandwidth for each path of each layer, and
when said already established path exists, and when available bandwidth on said already established path is not smaller than the bandwidth specified as required for the requested path of the same layer as said already established path, then said determining means determines that said already established path should be used.

30. A node apparatus according to claim 21, wherein the label of any one of layer paths is an optical wavelength used.

31. A node apparatus for setting up a layer-structured path constructed from multiple layers of paths, comprising:
means for receiving a first message that is transmitted from a start-point node of the highest-layer path, and that contains a label request for a plurality of layer paths;

means for mapping labels to the requested paths in response to said label request; and means for transmitting in response to said first message a second message containing therein the labels mapped by said mapping means.

32. A node apparatus according to claim 31, wherein the label of any one of layer paths is an optical wavelength used.

* * * * *